United States Patent
Suenaga et al.

[11] Patent Number: 5,835,282
[45] Date of Patent: Nov. 10, 1998

[54] ZOOM LENS SYSTEM

[75] Inventors: Yutaka Suenaga; Junichi Misawa, both of Yokohama, Japan

[73] Assignee: Nikon Corporation, Tokyo, Japan

[21] Appl. No.: 867,349

[22] Filed: Jun. 2, 1997

[30] Foreign Application Priority Data

Jun. 3, 1996 [JP] Japan ................................. 8-163864

[51] Int. Cl.⁶ ................................................. G02B 15/14
[52] U.S. Cl. ......................... 359/692; 359/687; 359/690
[58] Field of Search .................................. 359/692, 691, 359/689, 690, 688, 687, 686, 684, 676

[56] References Cited

U.S. PATENT DOCUMENTS 5,583,698  12/1996  Yamada et al. ........................ 359/687

FOREIGN PATENT DOCUMENTS 5-273466  10/1993  Japan.
06230285   8/1994  Japan.

Primary Examiner—Hung X. Dang
Attorney, Agent, or Firm—Michael N. Meller

[57] ABSTRACT

A zoom lens system is provided having a relatively small F-number, which remains nearly constant as the zoom lens system is moved from its wide-angle end to its telephoto end, and which provides an excellent imaging quality. The zoom lens system includes at least a first lens group $G_1$ having a positive refractive power, and a second lens group $G_2$ having a negative refractive power. The second lens group $G_2$ moves uniformly toward the image while the first lens group $G_1$ remains stationary. When the zoom lens system is moved from the wide-angle end to the telephoto end. The F-number is equal to or less than 2.1 over the entire zoom range.

13 Claims, 16 Drawing Sheets

ZOOM LENS SYSTEM

BACKGROUND OF THE INVENTION

The present invention relates to a moderate telephoto zoom lens which is suitable for applications such as a single-lens reflex camera or an electrical still camera. More particularly, it relates to a zoom lens with an F-number of approximately 2, an angle of view of approximately 16° to 33°, and a zoom ratio of approximately 2.

Conventional moderate telephoto zoom lenses tend to be a darker lens system than a single focus lens. A moderate telephoto zoom lens utilizes a bright lens in order to aggressively take advantage of the shallow depth of field of an object. Hence, a bright moderate telephoto zoom lens with high optical performance across the entire zooming range is desired.

Examples of a moderate telephoto zoom lens are found in Japanese Laid-Open Patent Application Nos. Hei 5-273466 and Hei 6-230285. In the zoom lenses in these Laid-Open Patent Applications, the F-number is larger at the telephoto endthan at the wide-angle end. The zoom lens disclosed in Laid-Open Patent Application No. Hei 5-273466 comprises five lens groups and its F-number varies from 2.05 to 2.88. The zoom lens disclosed in Laid-Open Patent Application No. Hei 6-230285 comprises five lens groups and its F-number varies from 3.5 to 4.6.

In the above-mentioned conventional zoom lenses, the F-number is larger at the telephoto end than at the wide-angle end. While the correction against spherical aberration is excellent, the F-number at the telephoto endbecomes large. The variation in exposure due to the change in the F-number as the zoom lens setting varies is unfavorable.

In other words, generally, a compact, user-friendly, moderate telephoto zoom lens with a small F-number, which remains constant irrespective of zoom lens setting, is desired.

However, in order to maintain the F-number constant when the zoom lens setting is changed, the incident angle of a specific ray becomes larger at the telephoto end than at the wide-angle end. This ray comes from the infinite-distance object point on the optical axis and passes through the border of the open aperture (hereinafter, called Rand ray), which determines the F-number. Hence, in a bright zoom lens with a relatively small, constant F-number, the correction against spherical aberration at the telephoto end becomes difficult.

Furthermore, each lens group needs to be corrected against aberration in order to keep the aberration of a zoom lens small after a zoom lens setting is changed. As a consideration for aberration correction of each lens group, the variation of the distortion aberration should be minimized even when the angle of view changes as the zoom lens setting varies. In addition, the aberration should be properly corrected for the Rand ray which has a large incident angle, especially the Rand ray at the telephoto end. The variation of the distortion aberration due to the change in the angle of view can be reduced by distributing the refraction power symmetrically across the aperture as much as possible. However, the aberration correction for the Rand ray cannot be achieved by symmetrical distribution of refraction power. The spherical aberration must be corrected for the Rand ray by reducing the spherical aberration of each lens group. Furthermore, the balance among the spherical aberrations of the lens groups must be adjusted when the zoom lens setting or focus setting is changed.

SUMMARY OF THE INVENTION

Accordingly, the zoom lens system incorporating the principles of the present invention has a relatively small F-number. In addition, the F-number is maintained nearly constant as the zoom lens setting varies. This allows for excellent imaging performance.

It is an object of the present invention to overcome the above problems. The zoom lens system incorporating the principles of this invention includes at least a first lens group $G_1$ having a positive refractive power, and a second lens group $G_2$ having a negative refractive power. The lens groups are placed in order with $G_1$ closest to the object. As the zoom lens setting varies from the wide-angle end to the telephoto end, the second lens group $G_2$ moves toward the image while the first lens group $G_1$ remains stationary. The F-number of the zoom lens remains equal to or below 2.1 for the entire zooming range. In addition, the zoom lens satisfies the following equations:

$$H_w/H_r < 0.92 \quad (1)$$

and $$H_t/H_r < 0.65 \quad (2)$$

where:
- $H_w$ is the incident angle of the primary ray at the first lens surface, which produces the maximum angle of view when the zoom lens setting is adjusted for the wide-angle end;
- $H_t$ is the incident angle of the primary ray at the first lens surface, which produces the maximum angle of view when the zoom lens setting is adjusted for the telephoto end; and
- $H_r$ is the incident angle of the Rand ray at the first lens surface when the zoom lens setting is adjusted for the telephoto end.

In the apparatus incorporating the principles of the present invention, the magnification varies from the wide-angle end to the telephoto end when the distance between the first lens group $G_1$ and the second lens group $G_2$ is increased by moving the second lens group $G_2$ closer to the image. Furthermore, the negative refractive power of the second lens group $G_2$ is made as large as possible in order to minimize the moving distance of the second lens group $G_2$ for the magnification change and hence, to make the entire system compact. In order to make the negative refractive power large, the second lens group $G_2$ in general, needs at least one positive and one negative lens element. Aberrations, such as spherical and chromatic, tend to be overcompensated because the second lens group $G_2$ has a large negative refractive power. Hence, it is necessary to compensate particularly for the spherical and chromatic aberrations in order to obtain a bright moderate telephoto zoom lens. It is preferred that equations (1) and (2) noted above also be satisfied in order to obtain a wide angle of view.

Equations (1) and (2) impose limits on the incident angle of the primary ray at the first lens surface, when the incident ray forms the maximum angle of view. Equation (1) is for the wide-angle end and Equation (2) is for the telephoto end. The equations limit the incident angle to be less than a certain fraction of the incident angle of the Rand ray at the first lens surface at the telephoto end. When both equations are satisfied, the effective diameter of the first lens surface of the first lens group $G_1$ becomes small and, therefore, the lens system becomes compact. Limiting the incident angle of the primary ray for the maximum angle of view contributes to the reduction of the chromatic aberration, astigmatism, and field curvature.

When the upper limit defined by Equation (1) is exceeded, the effective diameter of the first lens surface of the first lens group $G_1$ becomes too large, and the lens system does not become compact. When the upper limit defined by Equation (2) is exceeded, the incident angle of the primary ray for the maximum angle of view at the first lens surface becomes large and, as a result, correction against lateral aberration becomes difficult. If the lower limit for Equations (1) and (2) is set at 0, better performance can be obtained.

As an embodiment of this invention, the following structure is desirable. The zoom lens system comprises a first lens group $G_1$ having a positive refractive power, a second lens group $G_2$ having a negative refractive power, a third lens group $G_3$ having a positive refractive power, a fourth lens group $G_4$ having a negative refractive power, and a fifth lens group $G_5$ having a positive refractive power, which are placed in this order with the first lens group closest to the object. As the zoom lens system is moved from the wide-angle end to the telephoto end, the first lens group $G_1$ remains stationary and the other lens groups move along the optical axis. The second lens group $G_2$ moves closer to the image. The distances between the second lens group $G_2$ and the third lens group $G_3$ and between the third lens group $G_3$ and the fourth lens group $G_4$ become smaller.

This structure gives a nearly symmetrical distribution of the refractive power across the aperture and thus, enables the zoom lens to reduce the variation in the following areas as the zoom lens setting is changed: the F-number, the movement of the image plane, and the fluctuation of the distortion aberration. A light ray with a large angle of view can be corrected very well by this structure and, therefore, the allowable image height becomes tall. The aperture is either placed in front of, in back of, or in the middle of the third lens group $G_3$.

The image plane moves when the second lens group $G_2$ is moved in order to change the magnification. In order to compensate for the image plane movement, the third lens group $G_3$, the fourth lens group $G_4$, and the fifth lens group $G_5$ are moved closer to the image or the object. As the zoom lens setting is changed from the wide-angle end to the telephoto end, compensation for the image plane movement can be carried out very well if the distance between the second lens group $G_2$ and the third lens group $G_3$, and the distance between the third lens group $G_3$ and the fourth lens group $G_4$ are reduced. In addition, the distance between the fourth lens group $G_4$ and the fifth lens group $G_5$ should be increased in order to compensate for the image plane movement.

In the apparatus incorporating the principles of the present invention, it is desirable to move the third lens group $G_3$, the fourth lens group $G_4$, and the fifth lens group $G_5$ along the optical axis, as the focus setting changes from an infinitely distant object point to a close-distance object point. Out of these lens groups, the third lens group $G_3$ and the fifth lens group $G_5$ maintain a constant distance from each other.

A number of conventional moderate telephoto zoom lenses move portions of the first lens group $G_1$ as the focus setting changes. This structure has the disadvantage that the zoom lens becomes longer by a distance over which the focusing portion of the first lens group moves, and that the focus adjustment mechanism becomes large because the first lens group $G_1$ has a large diameter.

It is possible to keep the zoom lens shorter by having a structure in which the third lens group $G_3$, the fourth lens group $G_4$, and the fifth lens group $G_5$ move as the focus changes for a close-distance object. These lens groups have a smaller diameter than that of the first lens group $G_1$. In general, the distance over which the focusing lens groups travel can be made shorter by using lens groups with a stronger refractive power. This approach is not suggested because larger aberrations will be generated within each lens group when the refractive power is made stronger. In addition, larger spherical aberrations could be incurred frequently after the focus setting is changed. Therefore, the focus power distribution among focusing lens groups, the third lens group $G_3$, the fourth lens group $G_4$, and the fifth lens group $G_5$ need to be proper, and the shape and the glass materials of the lenses must be optimized.

By having a configuration in which the image plane shift is small although the third lens group $G_3$ and the fifth lens group $G_5$ move the same distance for focus adjustment as well as for zoom adjustment, the cam grooves for the barrels in which the lenses are mounted can be shorter and there will be advantages in cost and production tolerance requirements.

In the apparatus incorporating the principles of the present invention, it is desirable that the zoom lens satisfies the following conditions: The first lens group $G_1$ comprises a first positive lens element $L_{11}$, a second positive lens element $L_{12}$, and a negative lens element $L_{13}$. The three lens elements are placed in the above order with the first positive element $L_{11}$ closest to the object. In addition, the following equations (3), (4), and (5) should be satisfied:

$$0.5 < f_1/f_t < 1.5 \qquad (3)$$

$$-2.8 < \beta_{t2} < -1.5 \qquad (4)$$

and $$0.8 < R_a/R_b < 1.6 \qquad (5)$$

where:

$f_1$ is the focal length of the first lens group $G_1$;

$f_t$ is the focal length of the zoom lens system at the telephoto end;

$\beta_{t2}$ is the magnification of the second lens group $G_2$ at the telephoto end;

$R_a$ is the radius of curvature of the lens surface, facing the object, of the first positive lens element $L_{11}$ of the first lens group $G_1$; and $R_b$ is the radius of curvature of the lens surface, facing the object, of the second lens element $L_{12}$ of the first lens group $G_1$.

Equation (3) sets the parameters for the ratio of the focal length of the first lens group $G_1$ to the zoom lens system focal length. These relate to the tele ratio of the zoom lens system and the spherical aberration correction in the first lens group. When the upper limit of Equation (3) is exceeded, the refractive power of the first lens group becomes weak and the tele ratio tends to become small, which results in a longer zoom lens. When the lower limit of Equation (3) is exceeded, the refractive power of the first lens group becomes too strong and a greater spherical aberration occurs in the first lens group. In addition, in a preferred embodiment, the upper limit is set to 1.2 and the lower limit is set to 0.7 in Equation (3).

Equation (4) is the condition for the magnification of the second lens group $G_2$ at the telephoto end. It defines the condition to shorten the zoom lens system and to reduce the aberration which occurs in the second lens group $G_2$. When the magnification becomes large and the lower limit of Equation (4) is exceeded, divergence of the light emitted from the second lens group $G_2$ with respect to the light entering this lens group becomes too weak. Less aberration will occur in the following lens group, or in the fourth lens group $G_4$. However, the tele ratio becomes larger and hence, the zoom lens becomes longer. When the magnification is small and the upper limit of the Equation (4) is exceeded, the divergence of the light emitted from the fourth lens group $G_4$ with respect to the light entering this lens group becomes too strong and more aberration occurs in the second lens group $G_2$. This makes it difficult to keep a balance in aberration between the first lens group $G_1$ and the second lens group $G_2$. In addition, in a preferred embodiment, the upper limit is −1.9 and the lower limit is −2.4 in Equation (4).

Equation (5) determines the conditions for shaping the surfaces, facing the object, of the lens elements $L_{11}$ and $L_{12}$ with a strong positive refraction power so as to minimize the spherical aberration in the first lens group $G_1$. The first lens group $G_1$ is designed to have very strong positive refractive power so that the zoom lens becomes short and the lens movements associated with focus adjustments are reduced. In order to minimize the spherical aberrations which are generated at the object-side surface of $L_{11}$ and $L_{12}$ lens elements, it is desirable to shape each of these refraction surfaces to resemble an aplanatic surface. The lens element $L_{11}$ has a radius of curvature $R_a$, and the lens element $L_{12}$ has a radius of curvature $R_b$. Hence, the lenses are shaped so that $R_a$ manifests a stronger positive refractive power than $R_b$. If the upper limit of Equation (5) is exceeded, the refractive power of lens element $L_{11}$ becomes too strong. If the lower limit of Equation (5) is exceeded, the refractive power of lens element $L_{12}$ becomes too strong. In other words, exceeding either of the upper or lower limits causes undesirable spherical aberration. In addition, in a preferred embodiment, Equation (5) has an upper limit of 1.4 and a lower limit of 0.9.

In the apparatus incorporating the principles of the present invention, it is desirable that the fourth lens group $G_4$ comprises a negative lens element $L_{4n}$ and that the zoom lens also satisfies the following conditions:

$$3 < \beta_{t4} < 8 \quad (6)$$

$$|(R_d + R_c)/(R_d - R_c)| < 1.2 \quad (7)$$

and $$45 < \nu_{4n} \quad (8)$$

where $\beta_{t4}$ is the magnification of the fourth lens group $G_4$ at the telephoto end;

$R_c$ is the radius of curvature of the lens surface, facing the image, of the negative lens element $L_{4n}$ of the fourth lens group $G_4$;

$R_d$ is the radius of curvature of the lens surface, facing the object, of the negative lens element $L_{4n}$ of the fourth lens group $G_4$; and $\nu_{4n}$ is the Abbe number of the negative lens element $L_{4n}$ of the fourth lens group $G_4$.

Equation (6) relates to the magnification of the fourth lens group $G_4$ at the telephoto end. It determines the condition for shortening the zoom lens and reducing aberration which occurs at the fourth lens group $G_4$. When the magnification becomes smaller than the lower limit defined by Equation (6), the divergence of light emitted from the fourth lens group $G_4$ with respect to the light entering this lens group becomes weak. Then, the tele ratio increases and the zoom lens becomes long, while less aberration occurs in the fourth lens group $G_4$. When the magnification becomes larger than the upper limit defined by Equation (6), the divergence of light emitted from this lens group $G_4$ with respect to the light entering the fourth lens group $G_4$ becomes strong and more aberration occurs in the lens group. In addition, in a preferred embodiment, in Equation (6), the upper limit is 6.2 and the lower limit is 4.

Various kinds of aberration can be corrected and higher-order aberrations can be effectively prevented by using the shape and materials of the negative lens element $L_{4n}$ of the fourth lens group $G_4$ which satisfy Equations (7) and (8). Because of the above-mentioned reason, if the limits defined by Equations (7) and (8) are exceeded, higher-order aberrations occur. In addition, in a preferred embodiment, the limit of Equation (7) is 1 and that of Equation (8) is 50.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
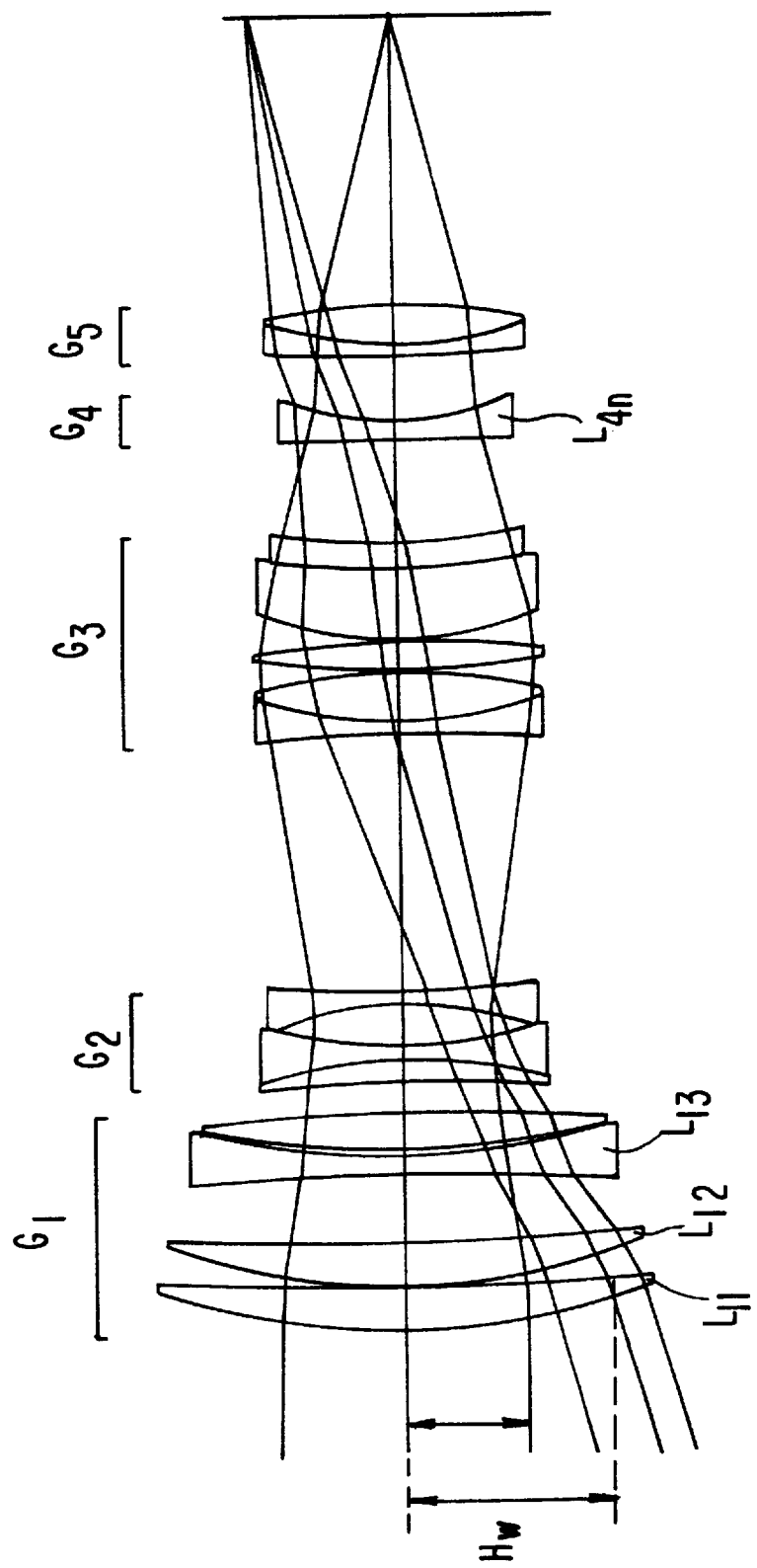
FIG. 1 is a side view of a first embodiment of the present invention showing the lens placement at the wide-angle end.
Figure 2:
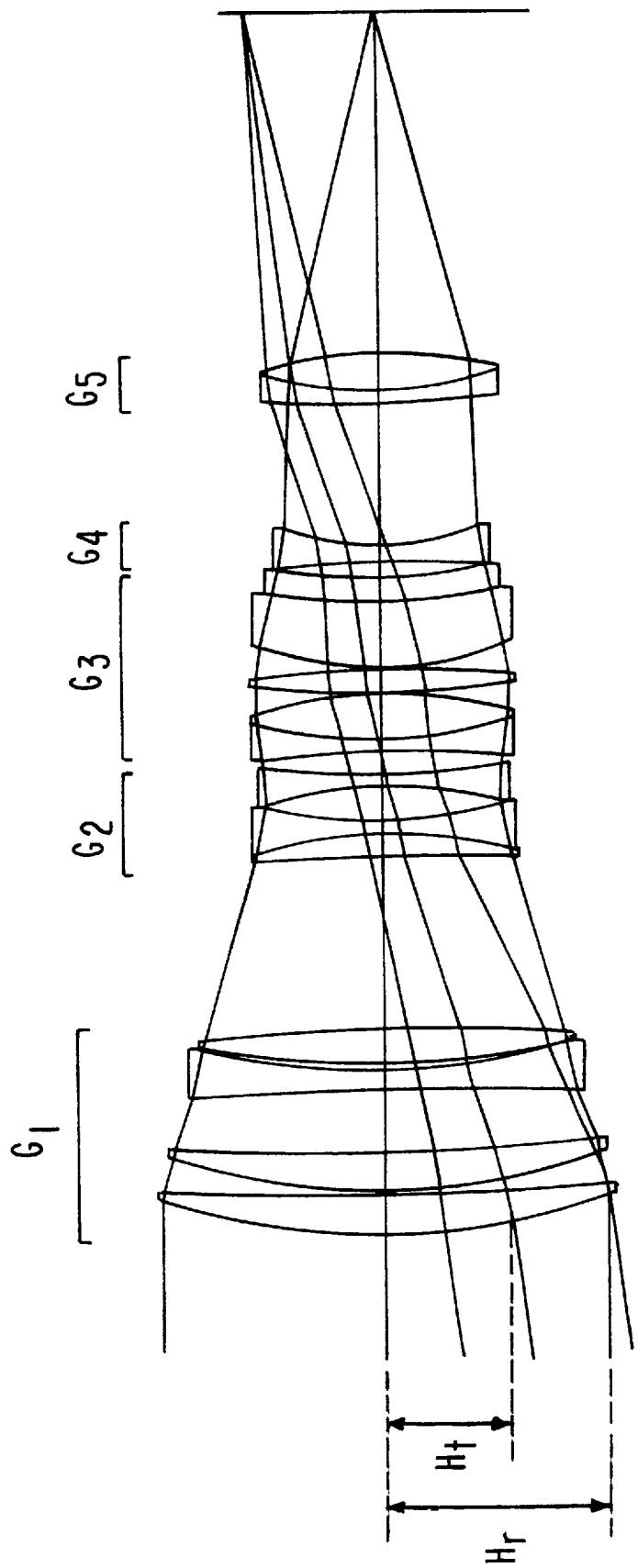
FIG. 2 is a side view of the first embodiment showing the lens placement at the telephoto end.

Embodiments of this invention will be explained. FIG. 1 and FIG. 2 show the lens elements of a first embodiment of the present invention. FIG. 1 shows the lens placement at the wide-angle end and FIG. 2 that at the telephoto end. FIG. 5, FIG. 8, FIG. 11, and FIG. 14 show the lens placement at the wide-angle end for the second through fifth embodiments, respectively.

The zoom lens system of each embodiment comprises at least a first lens group $G_1$ having a positive refractive power and a second lens group $G_2$ having a negative refractive power. Embodiments also include a third lens group $G_3$ having a positive refractive power, a fourth lens group $G_4$ having a negative refractive power, and a fifth lens group $G_5$ having a positive refractive power, which are arranged in this order with the first lens group $G_1$ closest to the object. It is clear that all the lens groups are arranged along a common optical axis.

Referring to FIG. 1, the first lens group $G_1$ comprises a first positive lens element $L_{11}$, a second positive lens element $L_{12}$, and a negative lens element $L_{13}$, which are arranged in this order with the first positive lens element $L_{11}$ closest to the object. The fourth lens group $G_4$ contains a negative lens element $L_{4n}$.

The first lens group $G_1$ of the first embodiment comprises the first positive lens element $L_{11}$ which is a positive meniscus lens with the convex surface facing the object, the second positive lens element $L_{12}$ which is also a positive meniscus lens with the convex surface facing the object, the negative lens element $L_{13}$ which is a biconcave lens, and a biconvex lens. All of the lenses in the first lens group $G_1$ are arranged in the above sequence with the first lens closest to the object. The second lens group $G_2$ comprises a compound lens and a biconcave lens. This compound lens is made up of a positive meniscus lens and a biconcave lens. The third lens group $G_3$ comprises a first compound lens, a biconvex lens and a second compound lens. The first compound lens is made up of a biconcave lens and a biconvex lens. The second compound lens is made up of a positive meniscus lens and a negative meniscus lens, each of which has the convex surface facing the object. The fourth lens group $G_4$ comprises the negative lens element $L_{4n}$ which is a biconcave lens. The fifth lens group $G_5$ comprises a compound lens of a negative meniscus lens and a biconvex lens.

The first lens group $G_1$ of the second embodiment (see FIG. 5) comprises the first positive lens element $L_{11}$ which is a biconvex lens, the second positive lens element $L_{12}$ which is a positive meniscus lens with the convex surface facing the object, the negative lens element $L_{13}$ which is a negative meniscus lens with the convex surface facing the object, and a positive meniscus lens with the convex surface facing the object. All of the lenses in the first lens group $G_1$ are arranged in the above sequence with the first lens closest to the object.

The second lens group $G_2$ comprises a compound lens and a biconcave lens. This compound lens is made up of a biconvex lens and a biconcave lens. The third lens group $G_3$ comprises a first compound lens, a biconvex lens and a second compound lens. The first compound lens is made up of a biconcave lens and a biconvex lens. The second compound lens is made up of a biconvex lens and a biconcave lens.

The fourth lens group $G_4$ comprises a compound lens of a positive meniscus lens and a negative lens element $L_{4n}$ which is a biconcave lens. The fifth lens group $G_5$ comprises a compound lens of a biconvex lens and a negative meniscus lens.

The first lens group $G_1$ of the third embodiment (see FIG. 8) comprises the first positive lens element $L_{11}$ which is a positive meniscus lens with the convex surface facing the object, the second positive lens element $L_{12}$ which is a biconvex lens, and a compound lens of the negative lens element $L_{13}$, which is a biconcave lens, and a positive meniscus lens. All of the lenses in the first lens group $G_1$ are arranged in the above sequence with the first lens closest to the object. The second lens group $G_2$ comprises a compound lens of a biconvex lens and a biconcave lens, and a compound lens of a biconcave lens and a positive meniscus lens. The third lens group $G_3$ comprises a first compound lens, a biconvex lens and a second compound lens. The first compound lens is made up of a biconcave lens and a biconvex lens. The second compound lens is made up of a biconvex lens and a biconcave lens. The fourth lens group $G_4$ comprises a compound lens of a positive meniscus lens and a negative lens element $L_{4n}$ which is a biconcave lens. The fifth lens group $G_5$ comprises a compound lens of a biconvex lens and a negative meniscus lens.

The first lens group $G_1$ of the fourth embodiment (see FIG. 11) comprises the first positive lens element $L_{11}$ which is a positive meniscus lens with the convex surface facing the object, the second positive lens element $L_{12}$ which is a biconvex lens, the negative lens element $L_{13}$ which is a negative meniscus lens with the convex surface facing the object, and a positive meniscus lens with the convex surface facing the object. All of the lenses in the first lens group $G_1$ are arranged in the above sequence with the first lens closest to the object.

The second lens group $G_2$ comprises a first compound lens, and a second compound lens. The first compound lens is made up of a biconcave lens and a positive meniscus lens. The second lens group is also made up of a biconcave lens and a positive meniscus lens.

The third lens group $G_3$ of the fourth embodiment comprises a compound lens, a biconvex lens, a positive meniscus lens, a negative meniscus lens, and a positive meniscus lens. Each of the last three meniscus lenses have the convex surface facing the object. The compound lens of this group is made up of a biconvex lens and a negative meniscus lens. The fourth lens group $G_4$ comprises a compound lens of a negative lens element $L_{4n}$ which is a biconcave lens, and a positive meniscus lens. The fifth lens group $G_5$ comprises a compound lens of a biconvex lens and a negative meniscus lens.

The first lens group $G_1$ of the fifth embodiment (see FIG. 14) comprises the first positive lens element $L_{11}$, a compound lens, and a positive meniscus lens with the convex surface facing the object. The first positive lens element $L_{11}$ is a positive meniscus lens with the convex surface facing the object. The compound lens is made up of the second positive lens element $L_{12}$ and the negative lens element $L_{13}$. The second positive lens element $L_{12}$ is a positive meniscus lens with the convex surface facing the object. The negative lens element $L_{13}$ is a negative meniscus lens. All of the lenses in the first lens group $G_1$ are arranged in the above sequence with the first lens closest to the object.

The second lens group $G_2$ of the fifth embodiment comprises a first compound lens, a second compound lens and a biconcave lens. The first compound lens is made up of a negative meniscus lens and a positive meniscus lens, both of which have the convex surface facing the object. The second compound lens is made up of a biconcave lens and a positive meniscus lens.

The third lens group $G_3$ comprises a compound lens, biconvex lens, a positive meniscus lens, a biconcave lens, and a biconvex lens. The compound lens is made up of a negative meniscus lens with the convex surface facing the object and a biconvex lens. The positive meniscus lens has its convex surface facing the object. The fourth lens group $G_4$ comprises a compound lens of a negative meniscus lens and a negative lens element $L_{4n}$ which is a biconcave lens. The fifth lens group $G_5$ comprises a compound lens of a biconvex lens and a negative meniscus lens.

When the zoom lens system is moved from the wide-angle end to the telephoto end in each of the five zoom lens system embodiments, the following occurs: The first lens group $G_1$ remains stationary and the second lens group $G_2$ moves uniformly toward the image. Also, in the embodiments having five lens groups, the third lens group $G_3$ moves so as to reduce its distance from the second lens group $G_2$. The fourth lens group $G_4$ moves so as to reduce its distance from the third lens group $G_3$. Lastly, the fifth lens group $G_5$ moves so as to maintain constant its distance from the third lens group $G_3$.

When the focus setting is shifted from the infinite-distance object point to a close-distance object point, the third lens group $G_3$, the fourth lens group $G_4$, and the fifth lens group $G_5$ move along the optical axis. During this movement the third lens group $G_3$ and the fifth lens group $G_5$ maintain their relative distance from each other.

The following Tables 1 through 5, list the values of the first embodiment through the fifth embodiment, respectively. In the system parameters of each table, f is the focal length, and $F_{NO}$ is the F-number. In the lens parameters table, the numbers in the number column is the sequential number of lens surfaces counted from the surface which is closest to the object, r in the second column is the radius of curvature of each of the lens surfaces, d in the third column is the adjacent lens surface separation, n in the fourth column is the refractive index of each lens to the d-line, $v_d$ in the fifth column is the Abbe number based on the d-line of each of the lenses, and the sixth column shows the lens group number and the lens number. In the Variable Separation in Variable Power table, $f/\beta$ is the focal length f or magnification $\beta$, and $D_0$ is the image point distance.

In addition, Table 6 lists the values for each equation for each embodiment.

TABLE 1

System Parameters
f = 76.5–147.0 $F_{NO}$ = 2.0

Lens Parameters

| Numbers | r | d | n | $v_d$ | | |
|---|---|---|---|---|---|---|
| 1 | 112.69 | 6.64 | 1.74809 | 52.3 | $G_1$ | $L_{11}$ |
| 2 | 853.82 | 0.10 | | | | |
| 3 | 100.00 | 6.24 | 1.49782 | 82.5 | $G_1$ | $L_{12}$ |
| 4 | 452.80 | 10.38 | | | | |
| 5 | −1222.50 | 3.50 | 1.79504 | 28.5 | $G_1$ | $L_{13}$ |
| 6 | 123.32 | 1.00 | | | | |
| 7 | 144.17 | 5.62 | 1.49782 | 82.5 | $G_1$ | |
| 8 | −312.94 | ($d_8$) | | | | |
| 9 | −442.98 | 3.72 | 1.86074 | 23.0 | $G_2$ | |
| 10 | −75.83 | 2.00 | 1.64000 | 60.0 | $G_2$ | |

TABLE 1-continued

| 11 | 73.35 | 5.98 | | | | |
|---|---|---|---|---|---|---|
| 12 | −62.76 | 2.00 | 1.69680 | 55.6 | $G_2$ | |
| 13 | 203.90 | ($d_{13}$) | | | | |
| 14 | Aperture | 2.00 | | | | |
| 15 | −302.20 | 2.00 | 1.80518 | 25.4 | $G_3$ | |
| 16 | 72.83 | 7.60 | 1.67024 | 57.5 | $G_3$ | |
| 17 | −70.86 | 0.10 | | | | |
| 18 | 157.84 | 3.51 | 1.80410 | 46.5 | $G_3$ | |
| 19 | −293.04 | 0.10 | | | | |
| 20 | 49.28 | 11.34 | 1.67024 | 57.5 | $G_3$ | |
| 21 | 105.73 | 3.97 | 1.79504 | 28.5 | $G_3$ | |
| 22 | 88.56 | ($d_{22}$) | | | | |
| 23 | −1040.70 | 3.00 | 1.60300 | 65.4 | $G_4$ | $L_{4n}$ |
| 24 | 43.53 | ($d_{24}$) | | | | |
| 25 | 168.71 | 2.00 | 1.79504 | 28.5 | $G_5$ | |
| 26 | 63.56 | 5.89 | 1.80410 | 46.5 | $G_5$ | |
| 27 | −88.28 | | | | | |

Variable Separation in Variable Power

| $f/\beta$ | 76.50 | 105.00 | 147.00 | −0.062 | −0.084 | −0.106 |
|---|---|---|---|---|---|---|
| $D_0$ | ∞ | ∞ | ∞ | 1300.00 | 1300.00 | 1300.00 |
| $d_8$ | 4.21 | 18.08 | 28.02 | 4.21 | 18.08 | 28.02 |
| $d_{13}$ | 37.61 | 24.16 | 1.19 | 29.63 | 17.61 | 6.61 |
| $d_{22}$ | 16.40 | 15.11 | 2.26 | 17.03 | 20.02 | 18.44 |
| $d_{24}$ | 9.64 | 10.94 | 23.79 | 9.02 | 6.02 | 7.61 |

TABLE 2

System Parameters
f = 76.5–147.0 $F_{NO}$ = 2.0

Lens Parameters

| Numbers | r | d | n | $v_d$ | | |
|---|---|---|---|---|---|---|
| 1 | 116.41 | 7.69 | 1.65159 | 58.4 | $G_1$ | $L_{11}$ |
| 2 | −1970.80 | 0.10 | | | | |
| 3 | 86.56 | 7.43 | 1.49782 | 82.5 | $G_1$ | $L_{12}$ |
| 4 | 463.18 | 6.50 | | | | |
| 5 | 596.31 | 3.50 | 1.79504 | 28.5 | $G_1$ | $L_{13}$ |
| 6 | 100.65 | 1.00 | | | | |
| 7 | 118.11 | 5.00 | 1.49782 | 82.5 | $G_1$ | |
| 8 | 154.94 | ($d_8$) | | | | |
| 9 | 397.38 | 3.77 | 1.86074 | 23.0 | $G_2$ | |
| 10 | −131.48 | 2.00 | 1.64000 | 60.0 | $G_2$ | |
| 11 | 79.27 | 6.19 | | | | |
| 12 | −71.22 | 2.00 | 1.69680 | 55.6 | $G_2$ | |
| 13 | 213.21 | ($d_{13}$) | | | | |
| 14 | Aperture | 1.80 | | | | |
| 15 | −193.53 | 2.00 | 1.79504 | 28.5 | $G_3$ | |
| 16 | 115.26 | 6.06 | 1.74809 | 52.3 | $G_3$ | |
| 17 | −74.31 | 0.10 | | | | |
| 18 | 172.68 | 3.50 | 1.80410 | 46.5 | $G_3$ | |
| 19 | −228.79 | 0.10 | | | | |
| 20 | 42.80 | 8.77 | 1.67024 | 57.5 | $G_3$ | |
| 21 | −201.62 | 2.99 | 1.79504 | 28.5 | $G_3$ | |
| 22 | 76.04 | ($d_{22}$) | | | | |
| 23 | −159.38 | 4.95 | 1.68893 | 31.0 | $G_4$ | |
| 24 | −41.45 | 2.23 | 1.60300 | 65.4 | $G_4$ | $L_{4n}$ |
| 25 | 41.63 | ($d_{25}$) | | | | |
| 26 | 121.12 | 6.81 | 1.80410 | 46.5 | $G_5$ | |
| 27 | −41.87 | 2.00 | 1.80518 | 25.4 | $G_5$ | 28 |
| −96.55 | | | | | | |

Variable Separation in Variable Power

| $f/\beta$ | 76.50 | 105.00 | 147.00 | −0.062 | −0.084 | −0.113 |
|---|---|---|---|---|---|---|
| $D_0$ | ∞ | ∞ | ∞ | 1300.00 | 1300.00 | 1300.00 |
| $d_8$ | 3.00 | 20.68 | 37.79 | 3.00 | 20.68 | 37.79 |
| $d_{13}$ | 44.80 | 26.42 | 1.50 | 35.15 | 18.65 | 1.50 |
| $d_{22}$ | 13.54 | 12.55 | 3.38 | 12.15 | 15.29 | 15.59 |
| $d_{25}$ | 10.18 | 11.17 | 20.34 | 11.57 | 8.42 | 8.13 |

TABLE 3

System Parameters
f = 76.5–147.0 $F_{NO}$ = 2.0

Lens Parameters

| Numbers | r | d | n | $\upsilon_d$ | | |
|---|---|---|---|---|---|---|
| 1 | 104.37 | 6.47 | 1.74809 | 52.3 | $G_1$ | $L_{11}$ |
| 2 | 491.66 | 0.10 | | | | |
| 3 | 101.64 | 8.06 | 1.49782 | 82.5 | $G_1$ | $L_{12}$ |
| 4 | −1199.30 | 4.70 | | | | |
| 5 | −1569.80 | 1.50 | 1.79504 | 28.5 | $G_1$ | $L_{13}$ |
| 6 | 115.30 | 5.26 | 1.49782 | 82.5 | $G_1$ | |
| 7 | 2311.90 | ($d_7$) | | | | |
| 8 | 358.30 | 3.73 | 1.86074 | 23.0 | $G_2$ | |
| 9 | −131.92 | 1.50 | 1.79668 | 45.3 | $G_2$ | |
| 10 | 79.29 | 5.77 | | | | |
| 11 | −73.33 | 1.50 | 1.80410 | 46.5 | $G_2$ | |
| 12 | 54.22 | 4.03 | 1.80518 | 25.4 | $G_2$ | |
| 13 | 220.91 | ($d_{13}$) | | | | |
| 14 | Aperture | 2.00 | | | | |
| 15 | −278.03 | 1.50 | 1.80518 | 25.4 | $G_3$ | |
| 16 | 113.69 | 6.53 | 1.74809 | 52.3 | $G_3$ | |
| 17 | −73.83 | 0.10 | | | | |
| 18 | 132.15 | 3.49 | 1.796681 | 45.3 | $G_3$ | |
| 19 | −470.58 | 0.10 | | | | |
| 20 | 50.32 | 6.88 | 1.74809 | 52.3 | $G_3$ | |
| 21 | −304.05 | 1.60 | 1.80518 | 25.4 | $G_3$ | |
| 22 | 98.07 | ($d_{22}$) | | | | |
| 23 | −156.37 | 3.43 | 1.80518 | 25.4 | $G_4$ | |
| 24 | −55.20 | 3.78 | 1.64000 | 60.0 | $G_4$ | $L_{4n}$ |
| 25 | 43.00 | ($d_{25}$) | | | | |
| 26 | 166.07 | 5.54 | 1.80410 | 46.5 | $G_5$ | |
| 27 | −38.32 | 1.50 | 1.80518 | 25.4 | $G_5$ | |
| 28 | −90.59 | | | | | |

Variable Separation in Variable Power

| f/β | 76.50 | 105.00 | 147.00 | −0.062 | −0.083 | −0.108 |
|---|---|---|---|---|---|---|
| $D_0$ | ∞ | ∞ | ∞ | 1300.00 | 1300.00 | 1300.00 |
| $d_7$ | 6.86 | 21.60 | 30.71 | 6.86 | 21.60 | 30.71 |
| $d_{13}$ | 39.87 | 26.72 | 2.50 | 32.41 | 19.79 | 5.87 |
| $d_{22}$ | 15.83 | 14.88 | 4.50 | 16.24 | 17.94 | 15.30 |
| $d_{25}$ | 14.08 | 15.03 | 25.42 | 13.67 | 11.98 | 14.62 |

TABLE 4

System Parameters
f = 76.5–147.0 $F_{NO}$ = 2.0

Lens Parameters

| Numbers | r | d | n | $\upsilon_d$ | | |
|---|---|---|---|---|---|---|
| 1 | 114.13 | 7.00 | 1.64006 | 60.0 | $G_1$ | $L_{11}$ |
| 2 | 545.96 | 0.20 | | | | |
| 3 | 116.07 | 8.10 | 1.49782 | 82.5 | $G_1$ | $L_{12}$ |
| 4 | −5277.4 | 0.20 | | | | |
| 5 | 905.78 | 3.00 | 1.69895 | 30.0 | $G_1$ | $L_{13}$ |
| 6 | 101.79 | 0.20 | | | | |
| 7 | 78.20 | 7.20 | 1.49782 | 82.5 | $G_1$ | |
| 8 | 1017.90 | ($d_8$) | | | | |
| 9 | −423.27 | 1.40 | 1.64006 | 60.6 | $G_2$ | |
| 10 | 54.04 | 3.30 | 1.86074 | 23.0 | $G_2$ | |
| 11 | 71.60 | 6.20 | | | | |
| 12 | −81.94 | 1.40 | 1.74809 | 52.3 | $G_2$ | |
| 13 | 54.45 | 3.40 | 1.80518 | 25.4 | $G_2$ | |
| 14 | 171.39 | ($d_{14}$) | | | | |
| 15 | Aperture | 0.50 | | | | |
| 16 | 494.18 | 6.00 | 1.60300 | 65.4 | $G_3$ | |
| 17 | −54.94 | 2.00 | 1.80518 | 25.4 | $G_3$ | |
| 18 | −79.48 | 0.20 | | | | |
| 19 | 86.49 | 4.20 | 1.74809 | 52.3 | $G_3$ | |
| 20 | −989.48 | 0.20 | | | | |
| 21 | 49.69 | 5.50 | 1.74809 | 52.3 | $G_3$ | |
| 22 | 132.19 | 1.50 | | | | |
| 23 | 511.65 | 1.50 | 1.80518 | 25.4 | $G_3$ | |
| 24 | 51.74 | 2.62 | | | | |
| 25 | 94.70 | 3.18 | 1.80410 | 46.5 | $G_3$ | |
| 26 | 457.92 | ($d_{26}$) | | | | |
| 27 | −456.79 | 1.50 | 1.61720 | 54.0 | $G_4$ | $L_{4n}$ |
| 28 | 28.98 | 3.60 | 1.80518 | 25.4 | $G_4$ | |
| 29 | 38.49 | ($d_{29}$) | | | | |
| 30 | 105.54 | 6.80 | 1.74809 | 52.3 | $G_5$ | |
| 31 | −50.00 | 1.50 | 1.69911 | 27.8 | $G_5$ | |
| 32 | −123.06 | | | | | |

Variable Separation in Variable Power

| f/β | 76.50 | 105.00 | 147.00 | −0.063 | −0.077 | −0.104 |
|---|---|---|---|---|---|---|
| $D_0$ | ∞ | ∞ | ∞ | 1300.00 | 1300.00 | 1300.00 |
| $d_8$ | 8.89 | 23.84 | 32.44 | 8.37 | 18.05 | 29.27 |
| $d_{14}$ | 38.26 | 25.71 | 3.50 | 30.39 | 22.55 | 8.57 |
| $d_{26}$ | 17.51 | 15.86 | 2.65 | 18.19 | 19.95 | 17.40 |
| $d_{29}$ | 4.46 | 6.10 | 19.32 | 3.78 | 2.01 | 4.57 |

TABLE 5

System Parameters
f = 76.5–147.0 $F_{NO}$ = 2.0

Lens Parameters

| Numbers | r | d | n | $\upsilon_d$ | | |
|---|---|---|---|---|---|---|
| 1 | 106.26 | 7.26 | 1.772789 | 49.4 | $G_1$ | $L_{11}$ |
| 2 | 1510.30 | 0.10 | | | | |
| 3 | 97.07 | 5.39 | 1.49782 | 82.5 | $G_1$ | $L_{12}$ |
| 4 | 280.07 | 3.50 | 1.75520 | 27.6 | $G_1$ | $L_{13}$ |
| 5 | 70.63 | 0.38 | | | | |
| 6 | 72.06 | 7.12 | 1.49782 | 82.5 | $G_1$ | |
| 7 | 362.82 | ($d_7$) | | | | |
| 8 | 367.52 | 2.00 | 1.64000 | 60.0 | $G_2$ | |
| 9 | 144.18 | 2.00 | 1.80458 | 25.4 | $G_2$ | |
| 10 | 190.96 | 2.40 | | | | |
| 11 | −572.88 | 2.00 | 1.71300 | 53.9 | $G_2$ | |
| 12 | 34.73 | 5.96 | 1.80518 | 25.4 | $G_2$ | |
| 13 | 94.20 | 5.18 | | | | |
| 14 | −86.71 | 2.00 | 1.74809 | 52.3 | $G_2$ | |
| 15 | 154.14 | ($d_{15}$) | | | | |
| 16 | Aperture | 1.00 | | | | |
| 17 | 1713.50 | 2.00 | 1.80458 | 25.4 | $G_3$ | |
| 18 | 146.76 | 5.50 | 1.64000 | 60.0 | $G_3$ | |
| 19 | −83.66 | 0.10 | | | | |
| 20 | 117.87 | 3.80 | 1.74809 | 52.3 | $G_3$ | |
| 21 | −440.11 | 0.10 | | | | |
| 22 | 46.68 | 5.43 | 1.74809 | 52.3 | $G_3$ | |
| 23 | 178.80 | 1.74 | | | | |
| 24 | 1711.10 | 3.40 | 1.80458 | 25.4 | $G_3$ | |
| 25 | 55.43 | 4.27 | | | | |
| 26 | 161.38 | 3.17 | 1.74400 | 45.0 | $G_3$ | |
| 27 | −273.68 | ($d_{27}$) | | | | |
| 28 | −142.09 | 2.62 | 1.80458 | 25.4 | $G_4$ | |
| 29 | −61.59 | 2.00 | 1.51860 | 69.9 | $G_4$ | $L_{4n}$ |
| 30 | 41.26 | ($d_{30}$) | | | | |
| 31 | −104.14 | 7.08 | 1.80410 | 46.5 | $G_5$ | |
| 32 | −38.78 | 2.00 | 1.75520 | 27.6 | $G_5$ | |
| 33 | −174.40 | | | | | |

Variable Separation in Variable Power

| f/β | 76.50 | 105.00 | 147.00 | −0.063 | −0.085 | −0.107 |
|---|---|---|---|---|---|---|
| $D_0$ | ∞ | ∞ | ∞ | 1300.00 | 1300.00 | 1300.00 |
| $d_7$ | 5.21 | 18.74 | 27.80 | 5.21 | 18.74 | 27.80 |
| $d_{15}$ | 38.28 | 24.23 | 2.00 | 30.49 | 17.10 | 6.11 |
| $d_{27}$ | 17.51 | 15.33 | 2.50 | 18.34 | 20.63 | 18.63 |
| $d_{30}$ | 5.88 | 8.05 | 20.89 | 5.05 | 2.76 | 4.75 |

TABLE 6

| Embodiments | 1 | 2 | 3 | 4 | 5 |
|---|---|---|---|---|---|
| (1) $H_w/H_r$ | 0.90 | 0.91 | 0.85 | 0.77 | 0.81 |
| (2) $H_t/H_r$ | 0.56 | 0.64 | 0.55 | 0.54 | 0.50 |
| (3) $f_1/f_t$ | 0.86 | 1.12 | 0.85 | 0.79 | 0.85 |
| (4) $\beta_{t2}$ | −2.05 | −2.13 | −2.17 | −2.32 | −1.96 |
| (5) $R_a/R_b$ | 1.13 | 1.34 | 1.03 | 0.98 | 1.09 |
| (6) $\beta_{t4}$ | 5.39 | 5.34 | 6.18 | 4.65 | 4.07 |
| (7) $|(R_d + R_c)/(R_d - R_c)|$ | 0.92 | 0.00 | 0.12 | 0.88 | 0.19 |
| (8) $\upsilon_{4n}$ | 65.40 | 65.40 | 60.00 | 54.00 | 69.90 |

Figure 3:
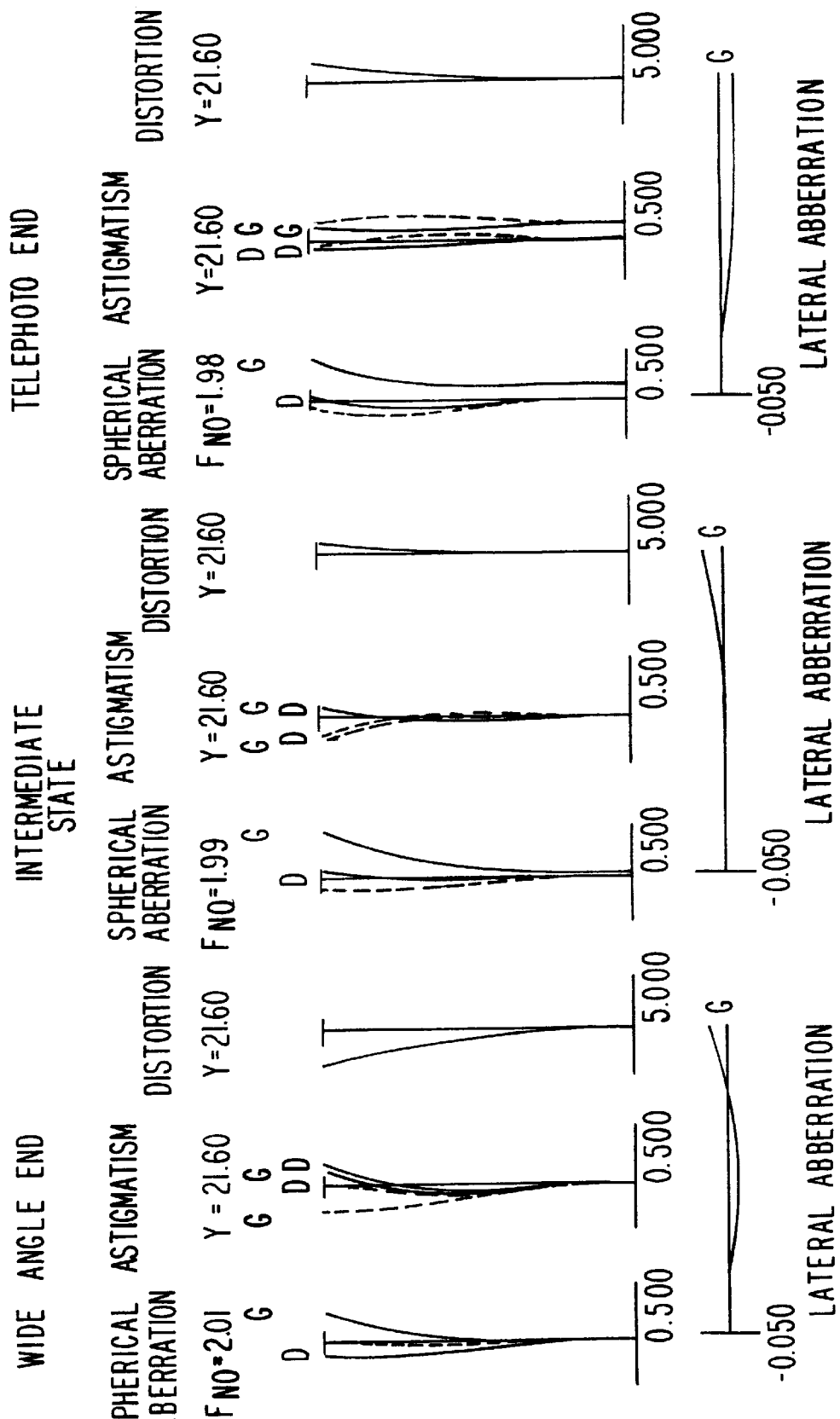
FIG. 3 shows waveforms of various aberration data when the zoom lens of the first embodiment was used to produce images of an infinite-distance object.
Figure 4:
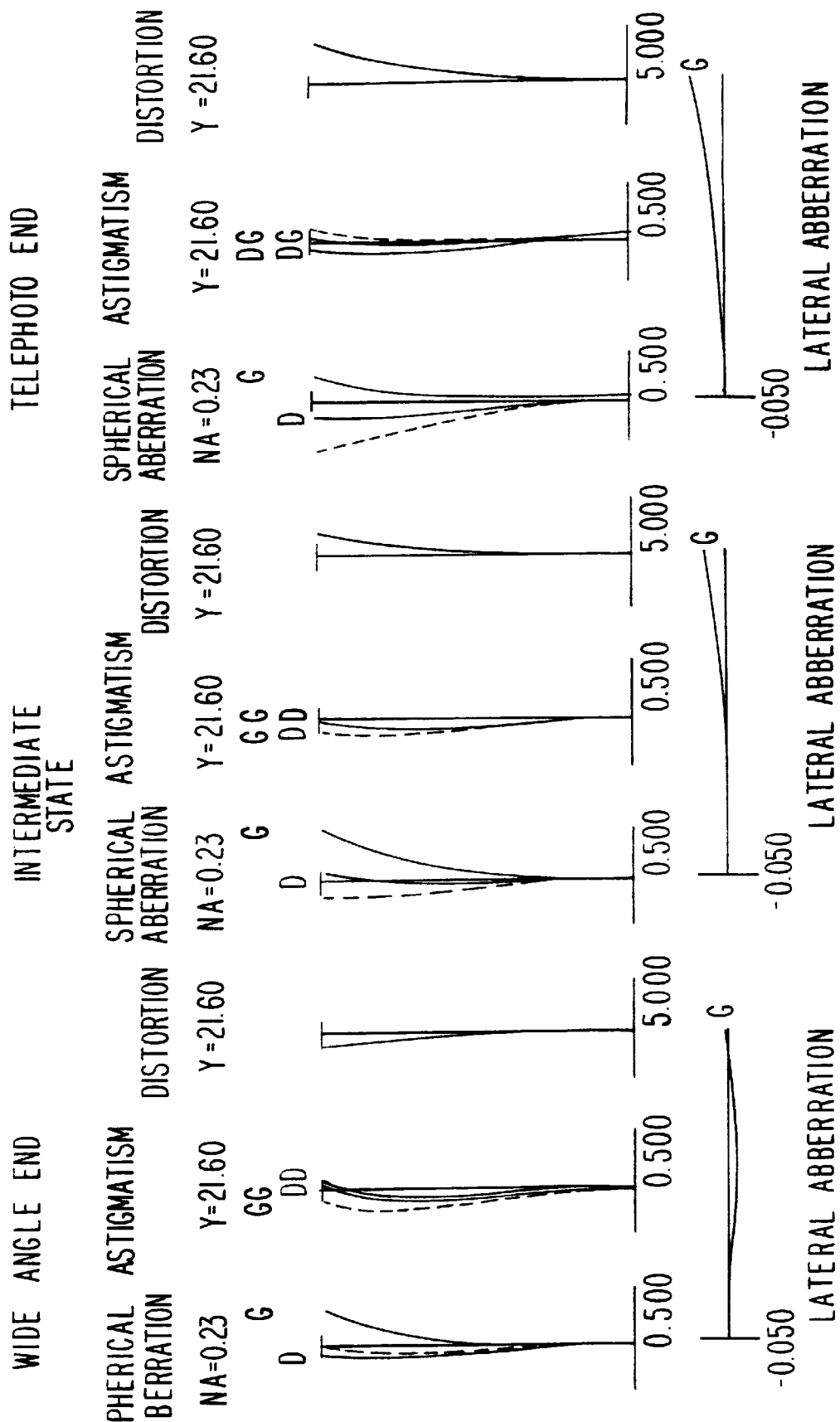
FIG. 4 shows waveforms of various aberration data when the zoom lens of the first embodiment was used to produce images of a close-distance object.
Figure 5:
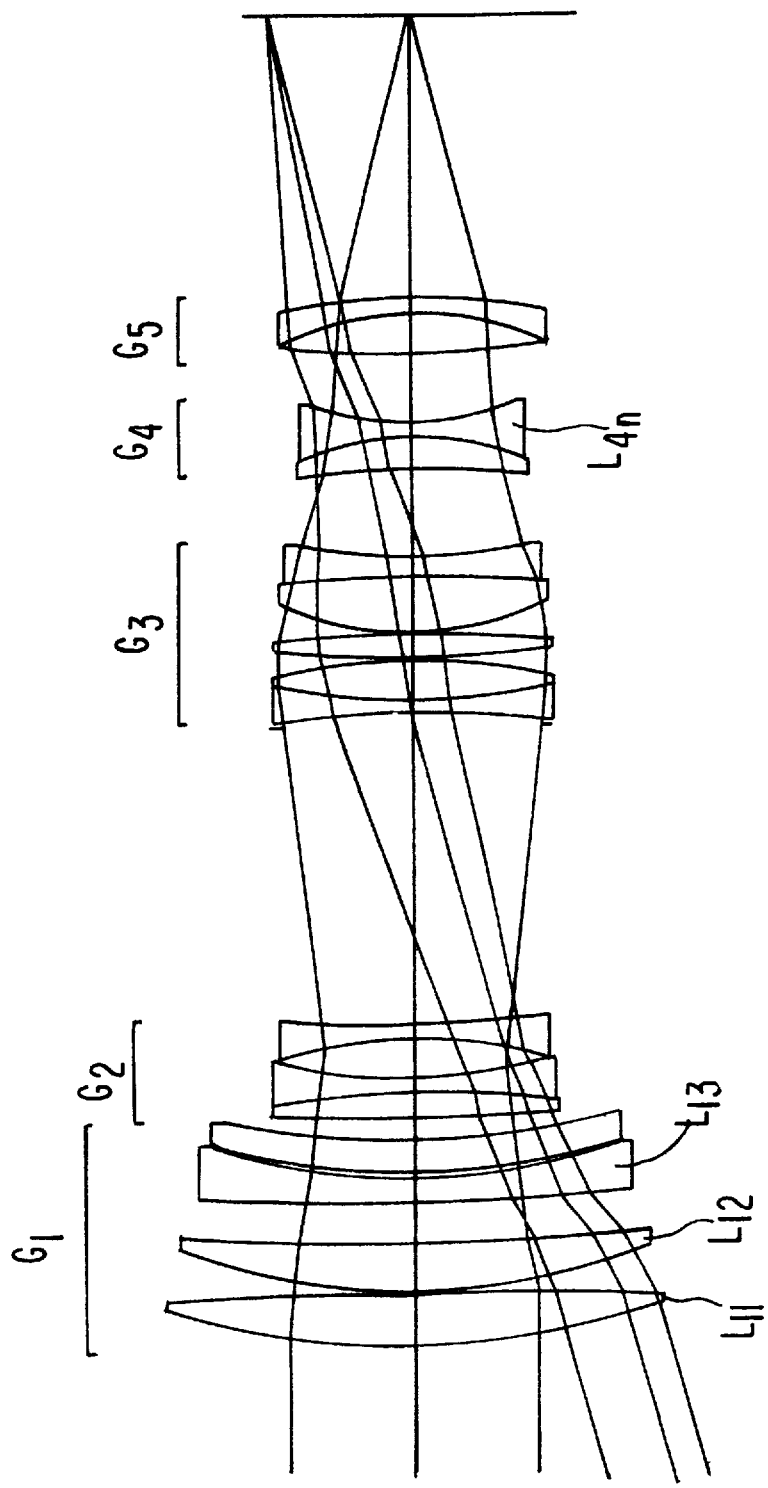
FIG. 5 is a side view of a second embodiment showing the lens placement at the wide-angle end.
Figure 6:
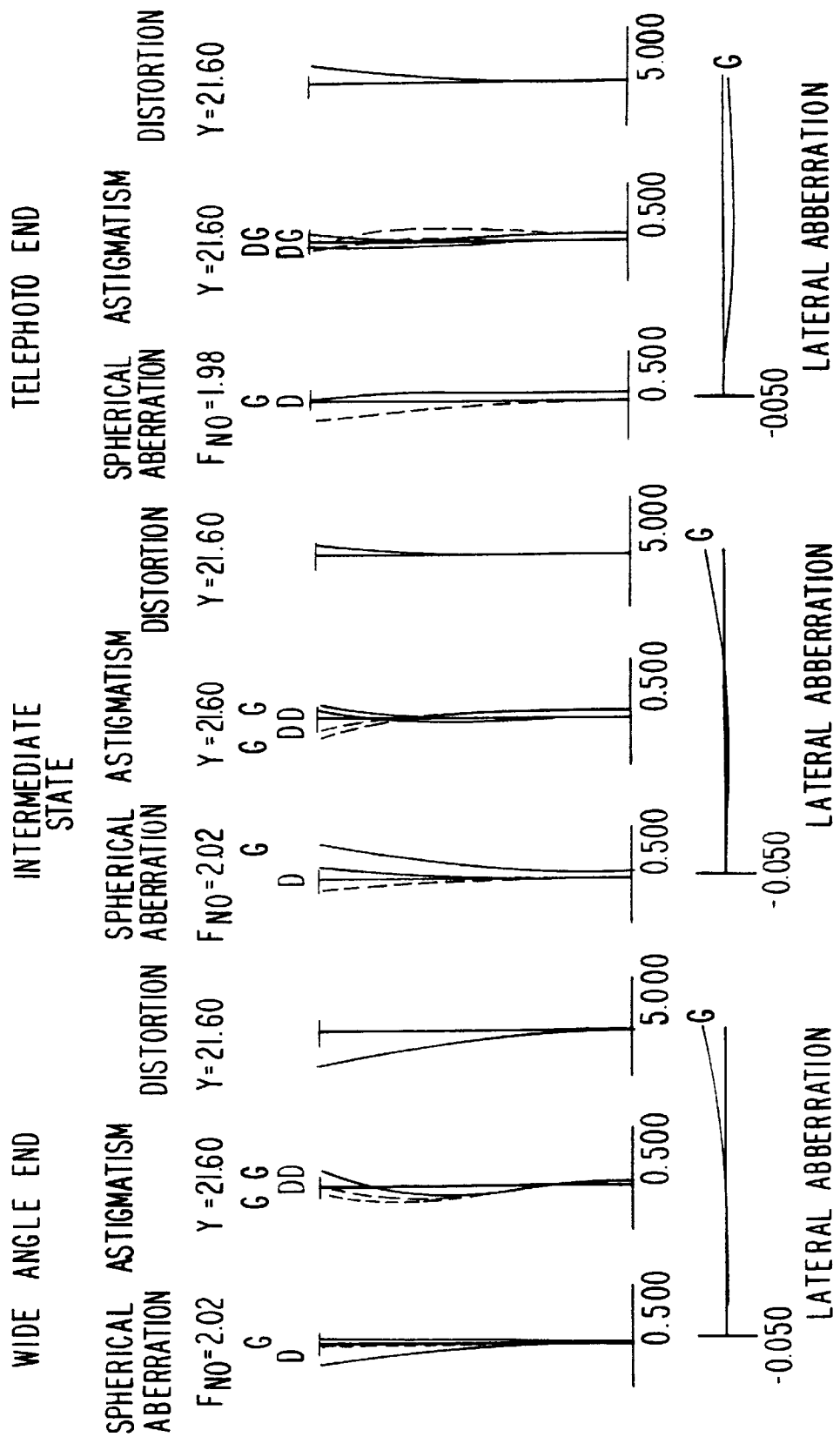
FIG. 6 shows waveforms of various aberration data when the zoom lens of the second embodiment was used to produce images of a infinite-distance object.
Figure 7:
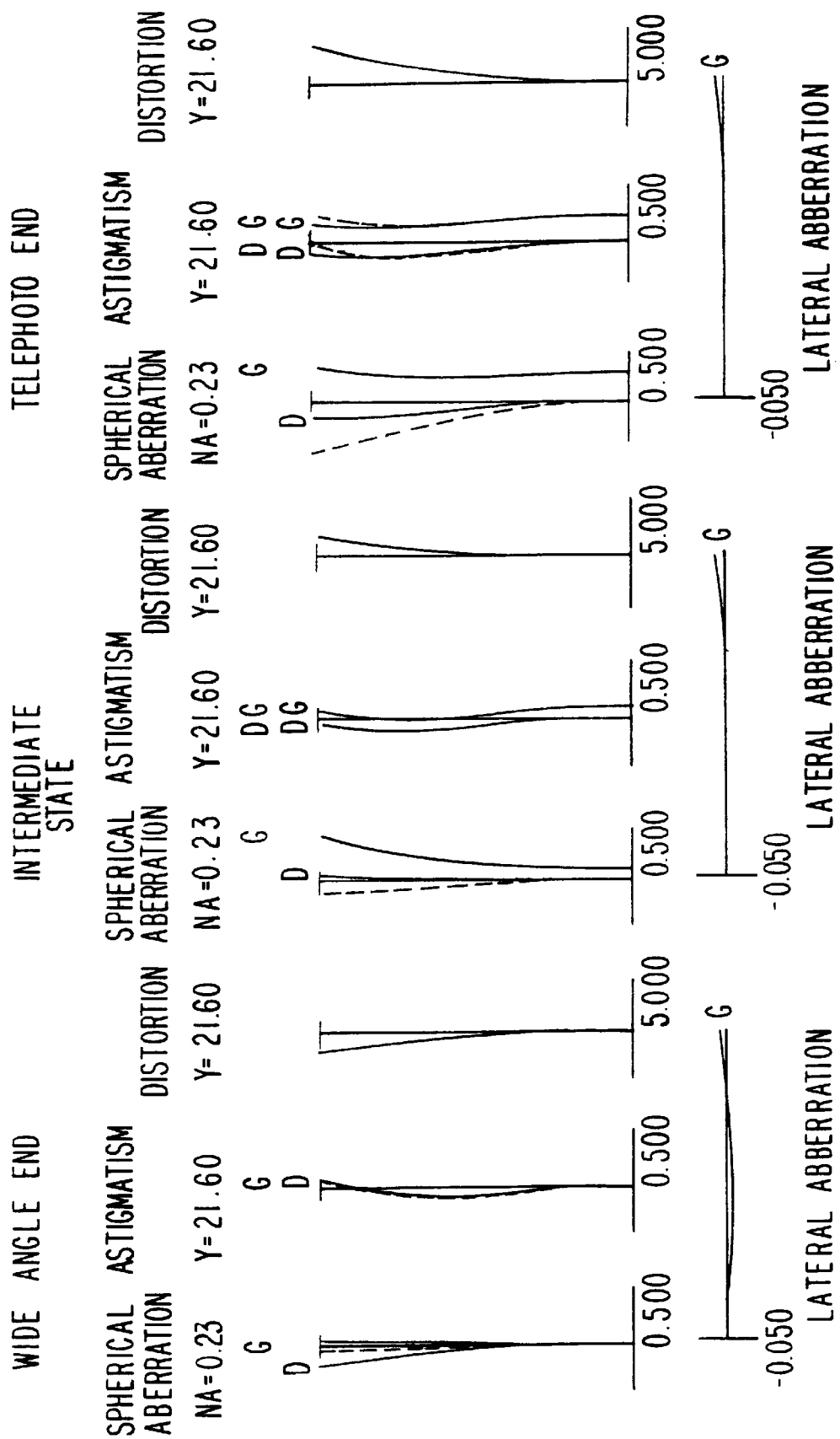
FIG. 7 shows waveforms of various aberration data when the zoom lens of the second embodiment was used to produce images of a close-distance object.
Figure 8:
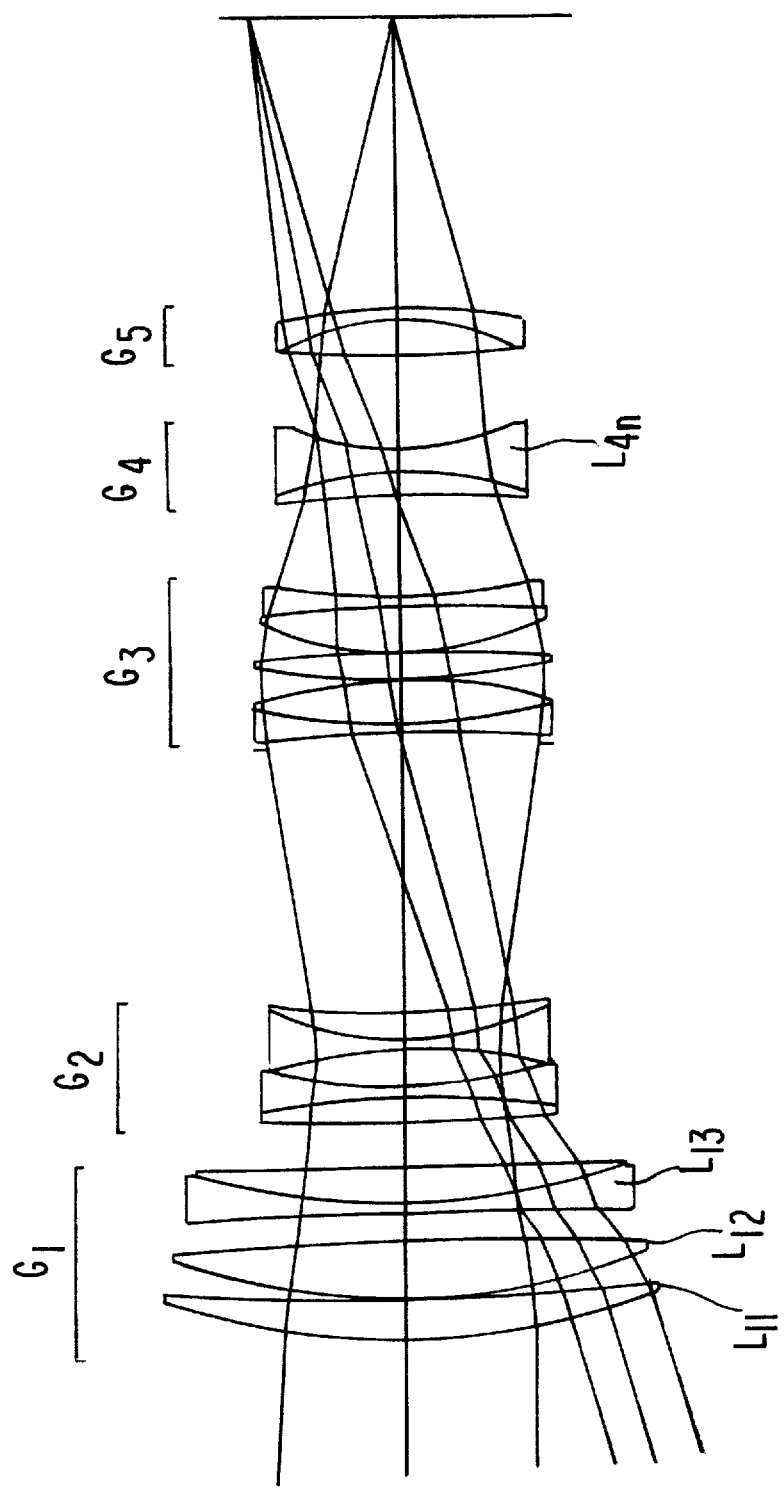
FIG. 8 is a side view of a third embodiment showing the lens placement at the wide-angle end.
Figure 9:
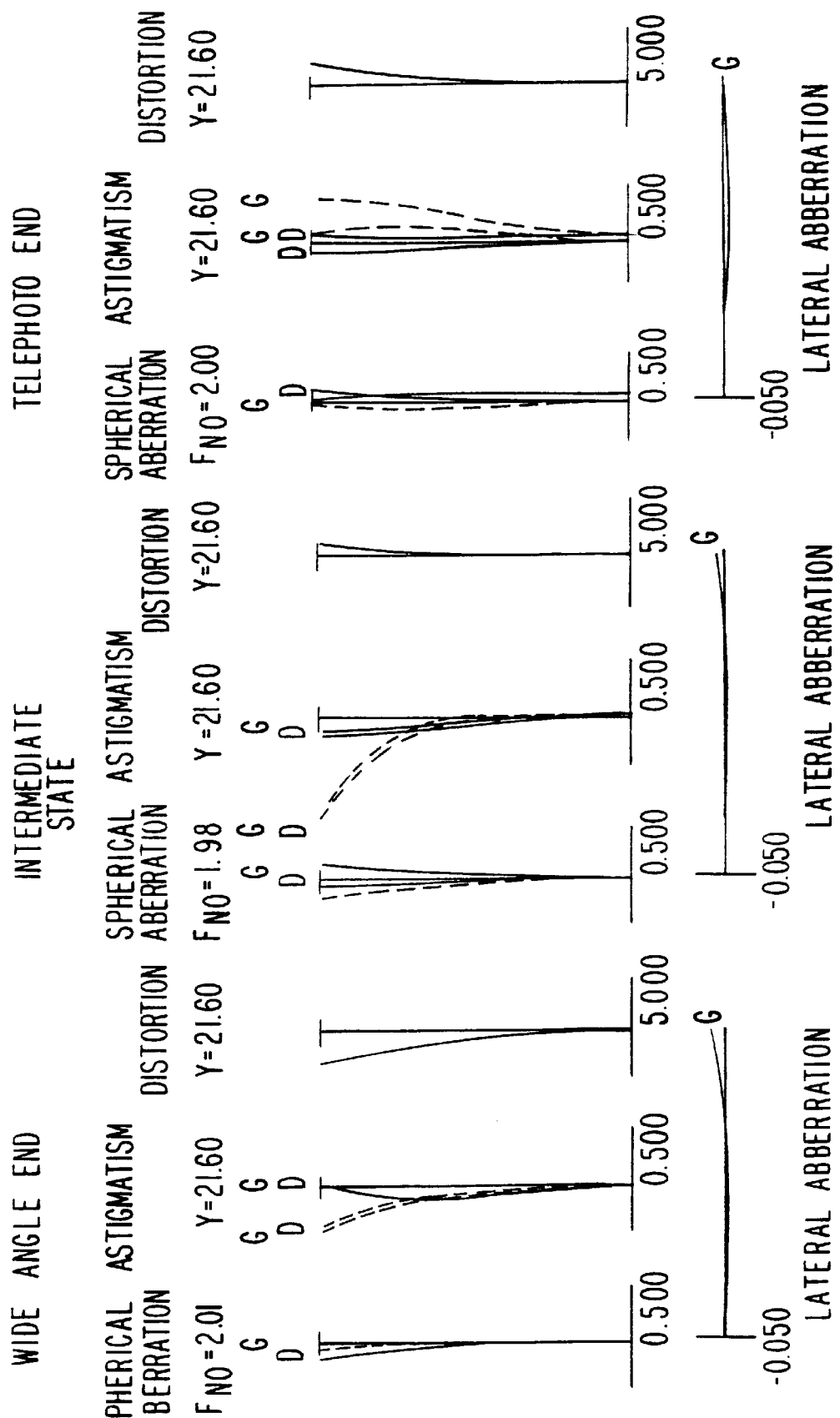
FIG. 9 shows waveforms of various aberration data when the zoom lens of the third embodiment was used to produce images of a infinite-distance object.
Figure 10:
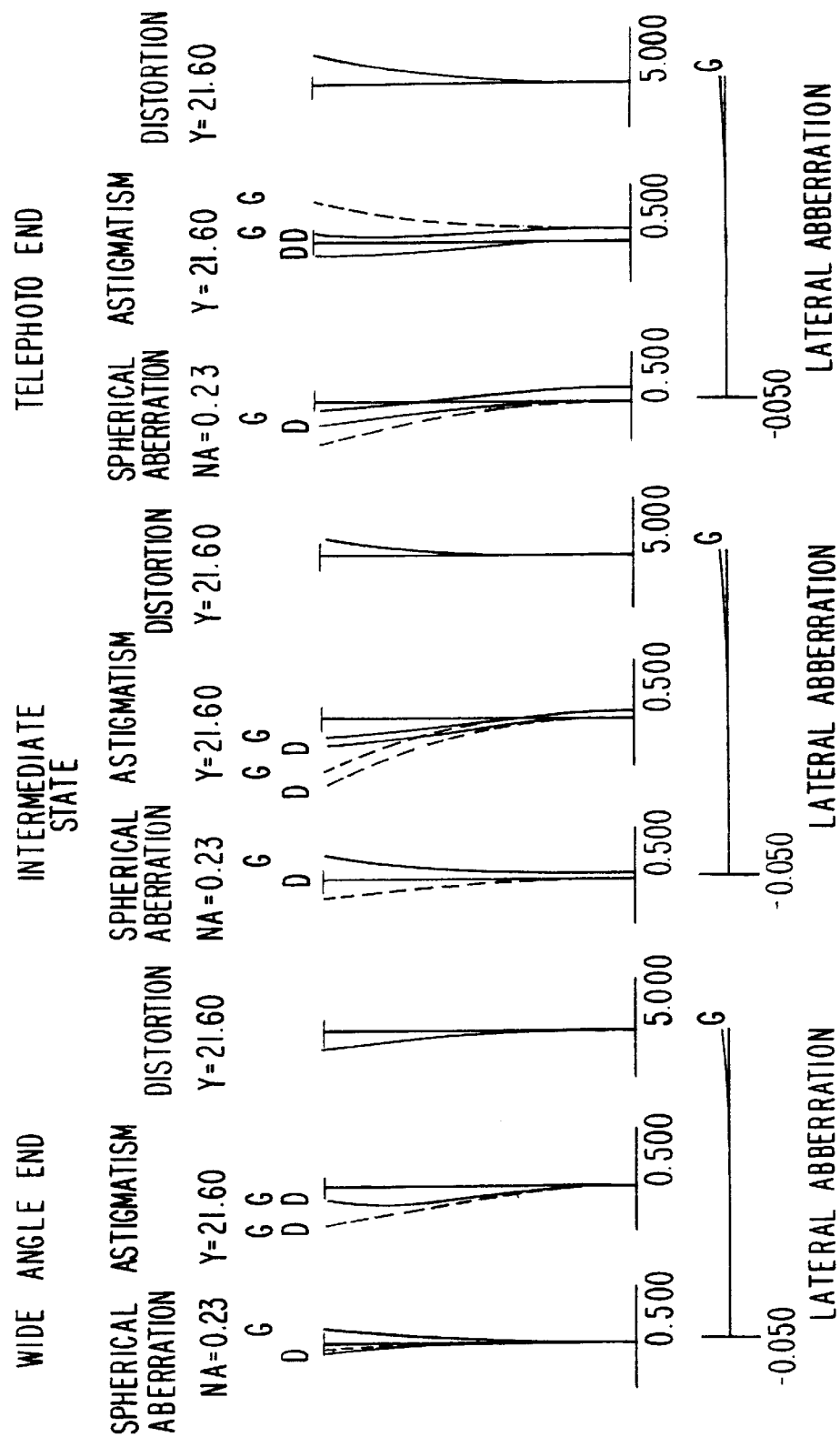
FIG. 10 shows waveforms of various aberration data when the zoom lens of the third embodiment was used to produce images of a close-distance object.
Figure 11:
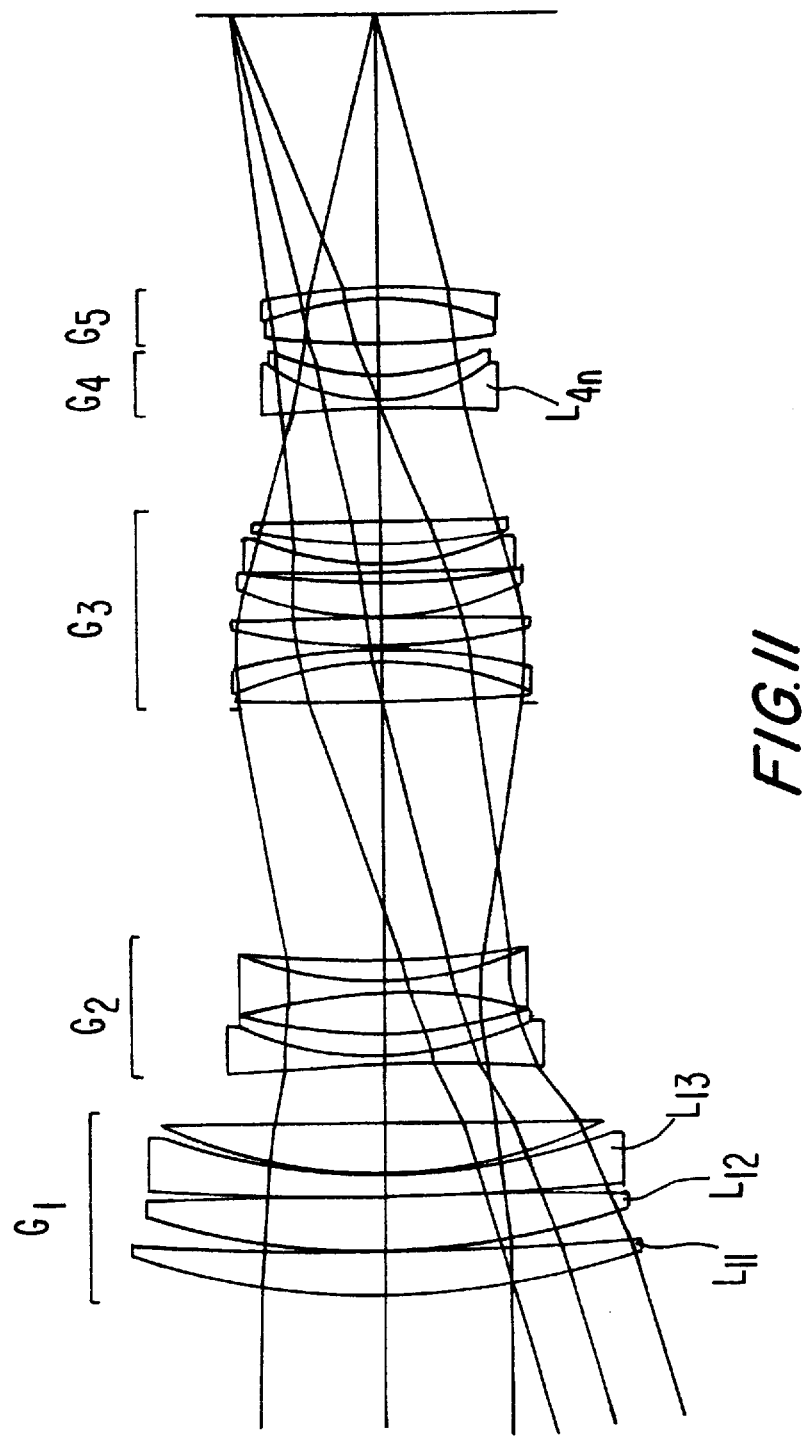
FIG. 11 is a side view of a fourth embodiment showing the lens placement at the wide-angle end.
Figure 12:
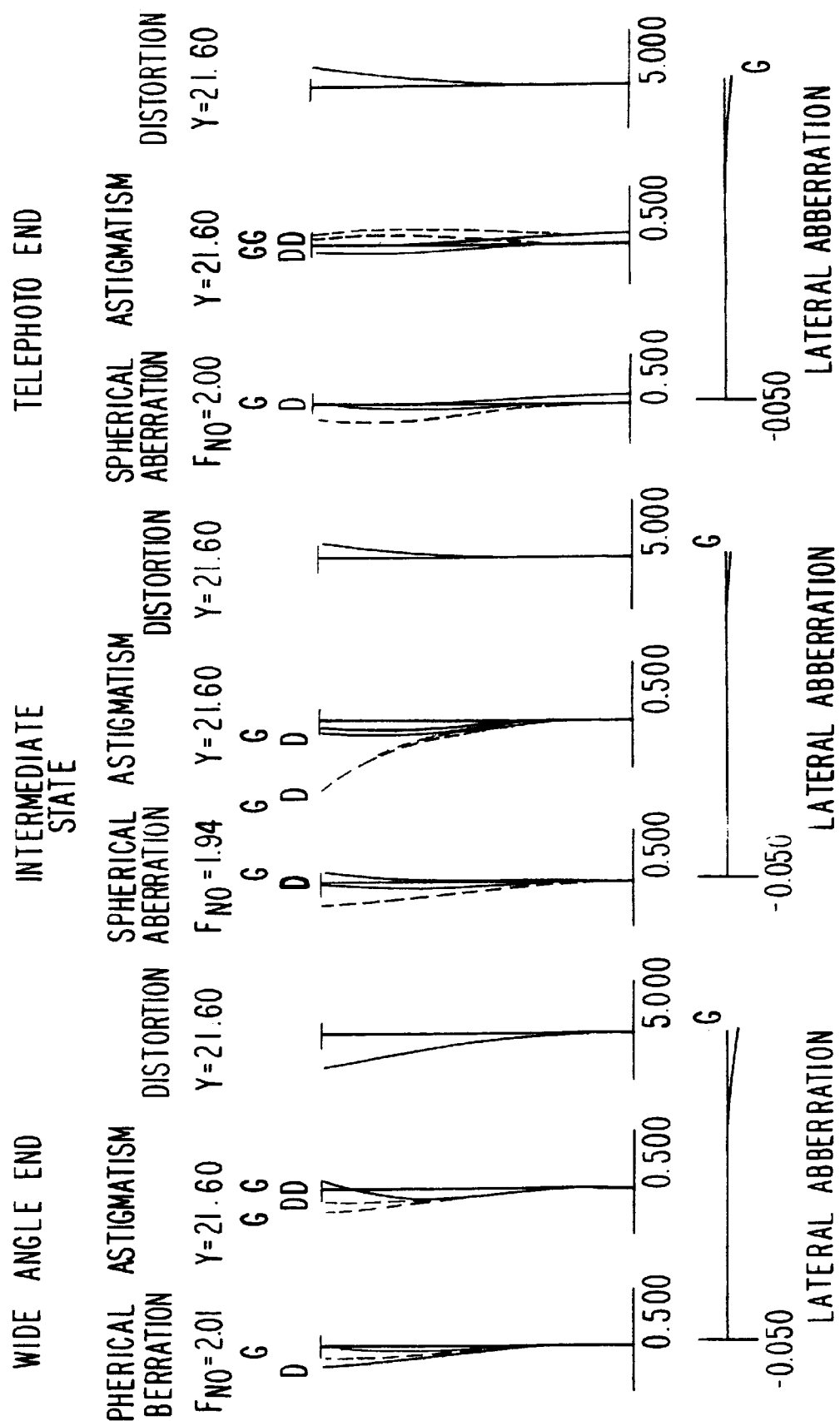
FIG. 12 shows waveforms of various aberration data when the zoom lens of the fourth embodiment was used to produce images of a infinite-distance object.
Figure 13:
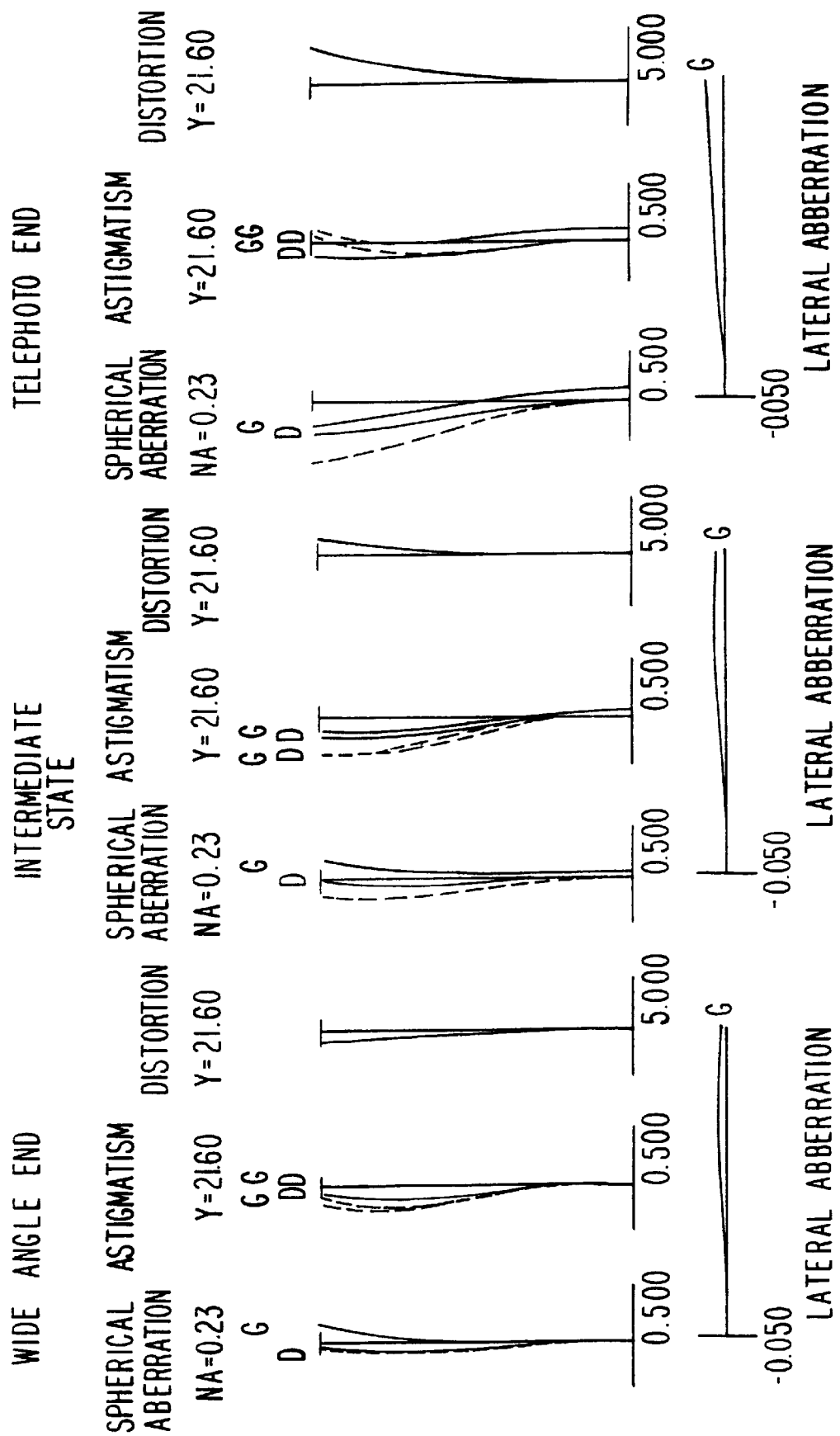
FIG. 13 shows waveforms of various aberration data when the zoom lens of the fourth embodiment was used to produce images of a close-distance object.
Figure 14:
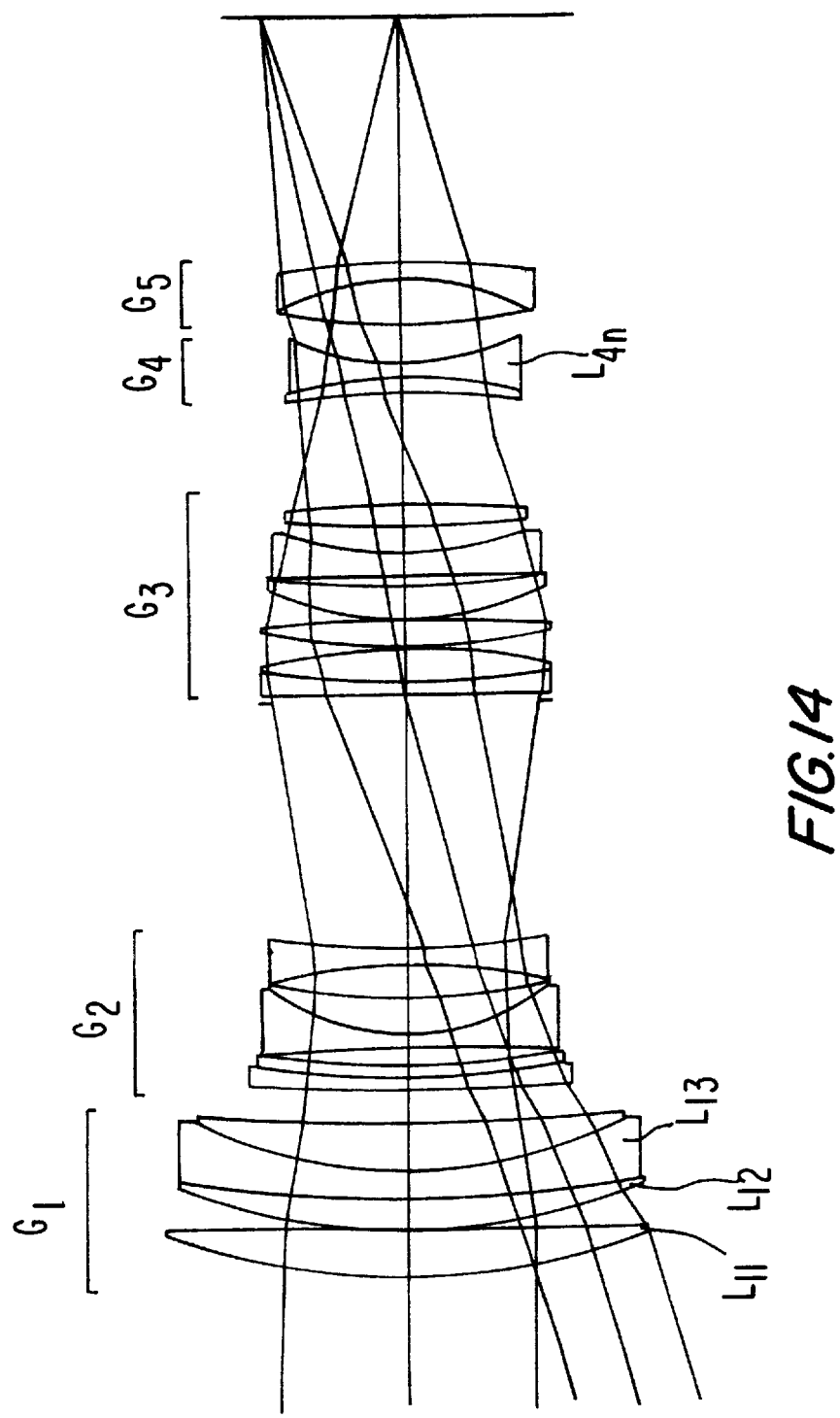
FIG. 14 is a side view of a fifth embodiment showing the lens placement at the wide-angle end.
Figure 15:
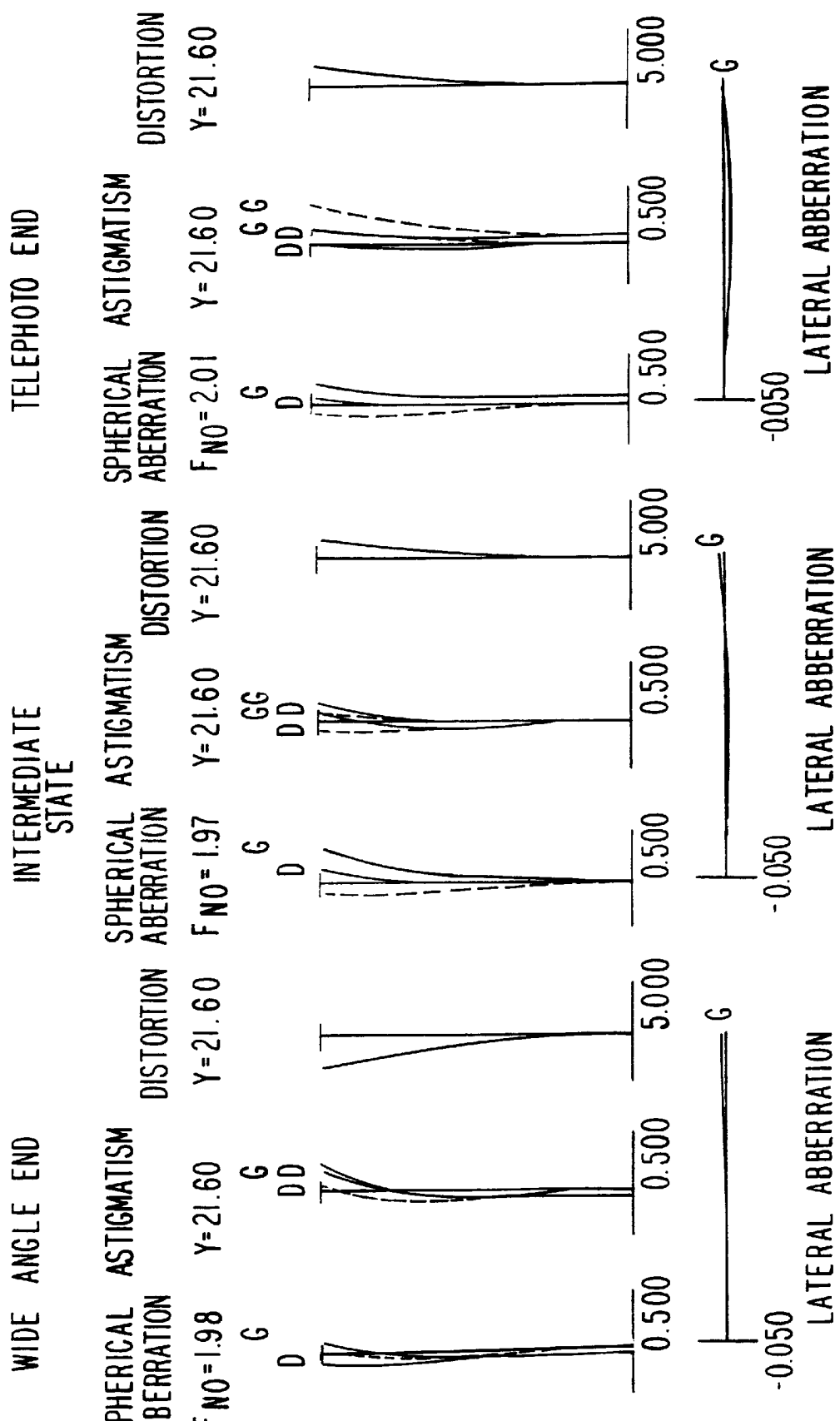
FIG. 15 shows waveforms of various aberration data when the zoom lens of the fifth embodiment was used to produce images of a infinite-distance object.
Figure 16:
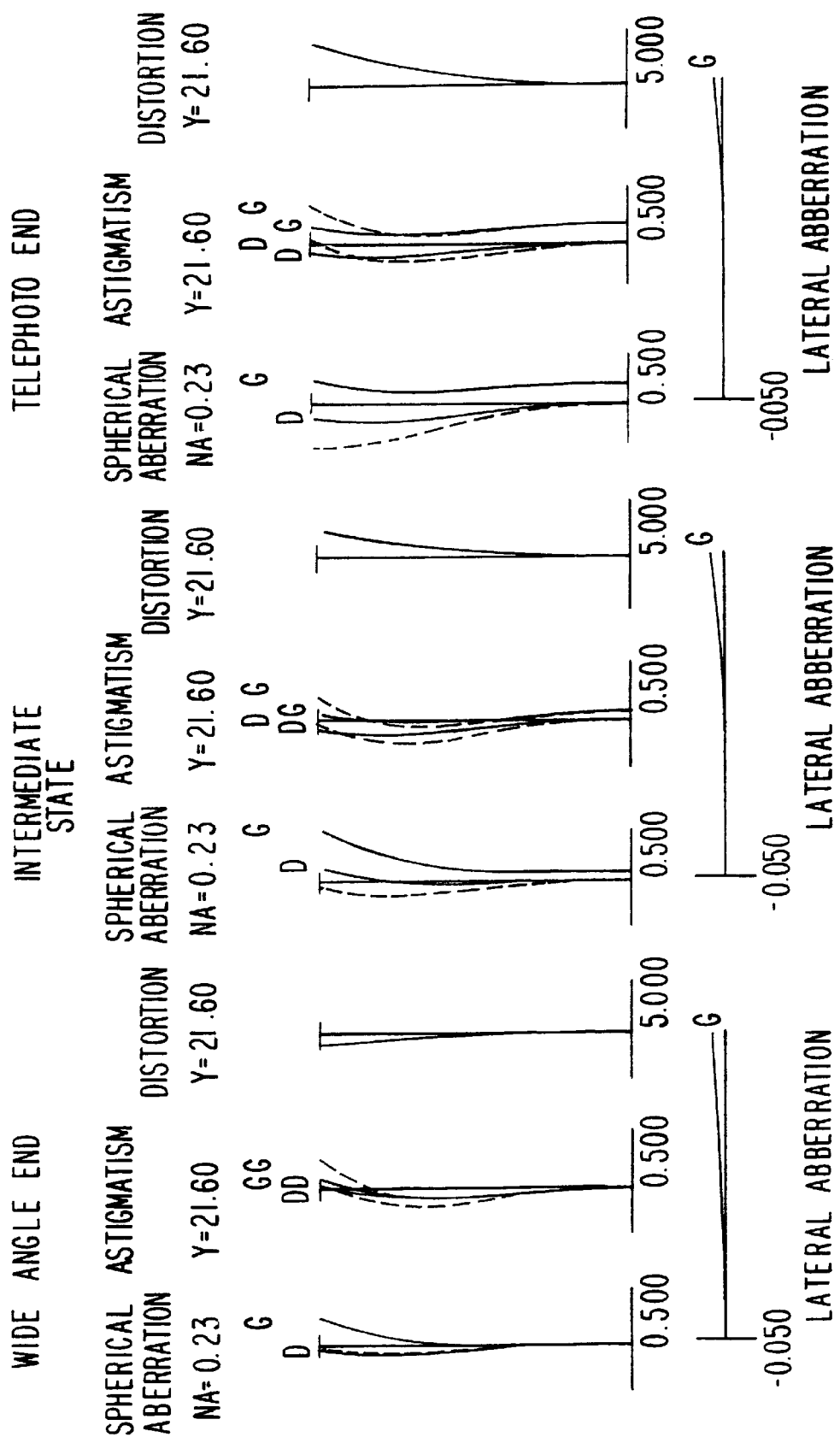
FIG. 16 shows waveforms of various aberration data when the zoom lens of the fifth embodiment was used to produce images of a close-distance object.

FIG. 3 shows the spherical aberration, astigmatism, distortion aberration, and lateral aberration for the first embodiment. These four aberrations are grouped at the wide-angle end, intermediate state, and the telephoto end when the zoom lens system of the first embodiment was used to produce images of an infinite-distance object. FIG. 4 shows the comparable aberrations when the zoom lens system of the first embodiment was used to produce images of a close-distance object (1300 mm from object to image plane). Similarly, FIG. 6 and FIG. 7, FIG. 9 and FIG. 10, FIG. 12 and FIG. 13, and FIG. 15 and FIG. 16 show the aberrations of the zoom lens of the second, third, fourth, and fifth embodiments, respectively. In these Figures which show aberrations, $F_{NO}$ is an F-number, NA, a numerical aperture, and Y, the image height. The dotted line in the graphs for the spherical aberration represents the sine condition. The solid line in the graphs for the astigmatism represents a sagittal plane and the dotted line a meridional plane.

As can be observed clearly in the Figures which show aberration data, zoom lens systems constructed in accordance with the principles of the present invention are obtained which have an F-number equal to or less than 2.1 in the entire zooming range and which exhibit an excellent imaging performance when the above-described structures are used and when the above-noted equations are satisfied.

As explained above, this invention achieves a bright zoom lens with a constant F-number irrespective of the zoom lens setting while maintaining an excellent imaging performance of the optics. The improvements in the refraction power distribution and the movements of lens groups over conventional zoom lenses have made it possible to obtain such a bright zoom lens.

Various modifications will become possible for those skilled in the art after receiving the teachings of the present disclosure without departing from the scope thereof.

What is claimed is:

1. A zoom lens system having an optical axis and being movable between a wide-angle end and a telephoto end along said optical axis and having an aperture and a first end adapted to face an object to produce an image of said object, said system comprising:

at least a first lens group $G_1$ having a positive refractive power, and a second lens group $G_2$ having a negative refractive power, said lens groups being placed in the above order with $G_1$ closest to said first end, said second lens group $G_2$ moving toward said image while said first lens group $G_1$ remains stationary as the zoom lens system is moved from its wide-angle end to its telephoto end;

the F-number of said zoom lens system remaining equal to or below 2.1 as said system is moved between its wide-angle end and its telephoto end;

said zoom lens system satisfying the following equations (1) and (2):

$$H_w/H_r < 0.92 \quad (1)$$

and $$H_t/H_r < 0.65 \quad (2)$$

where:

$H_w$ is the incident angle of the primary ray at the first lens surface of said first lens group $G_1$, which produces the maximum angle of view when said zoom lens system is in its wide-angle end;

$H_t$ is the incident angle of said primary ray at said first lens surface, which produces the maximum angle of view when said zoom lens system is in its telephoto end; and $H_r$ is the incident angle of the ray at said first lens surface when said zoom lens system is in its telephoto end and when a ray from an infinite-distance object point on the optical axis of said system passes the largest circumference within said aperture.

2. A zoom lens system, as claimed in claim 1, wherein said system comprises said first lens group $G_1$ having a positive refractive power, said second lens group $G_2$ having a negative refractive power, a third lens group $G_3$ having a positive refractive power, a fourth lens group $G_4$ having a negative refractive power, and a fifth lens group $G_5$ having a positive refractive power, said lens groups being placed in the above order with $G_1$ being closest to said first end, and wherein said second, third, fourth, and fifth lens groups $G_2$, $G_3$, $G_4$, and $G_5$ move along said optical axis, while said first lens group $G_1$ remains stationary as said zoom lens system is moved from the wide-angle end to the telephoto end, and said second lens group $G_2$ moves toward said image, and the distances between said second lens group $G_2$ and said third lens group $G_3$, and said third lens group $G_3$ and said fourth lens group $G_4$ become smaller as said zoom lens system is moved from the wide-angle end to the telephoto end.

3. A zoom lens system, as claimed in claim 2, wherein an adjustable aperture is placed either in front of, in back of, or in the middle of said third lens group $G_3$.

4. A zoom lens system, as claimed in claim 3, wherein said third, fourth, and fifth lens groups, $G_3$, $G_4$, and $G_5$, of said zoom lens system move along said optical axis, and said third and fifth lens groups, $G_3$, and $G_5$, maintain a constant distance from each other as said system is focused from the infinite-distant object point to the close-distance object point.

5. A zoom lens system, as claimed in claim 4, wherein said fourth lens group $G_4$ comprises a negative lens element $L_{4n}$, said zoom lens system satisfying the following equations (6) and (7):

$$3 < \beta_{t4} < 8 \quad (6)$$

and $$|(R_d + R_c)/(R_d - R_c)| < 1.2 \quad (7)$$

where:

$\beta_{t4}$ is the actual magnification of the fourth lens group $G_4$ at the telephoto end;

$R_c$ is the radius of curvature of the lens surface, facing said image, of said negative lens element $L_{4n}$ of the fourth lens group $G_4$; and $R_d$ is the radius of curvature of the lens surface, facing said first end, of the negative lens element $L_{4n}$ of the fourth lens group $G_4$.

6. A zoom lens system, as claimed in claim 3, wherein said first lens group $G_1$ includes a first positive lens element $L_{11}$, a second positive lens element $L_{12}$, and a negative lens element $L_{13}$, said three lens elements being placed in the above order with said first positive element closest to said first end, said zoom lens system also satisfying the following equations (3), (4), and (5):

$$0.5 < f_1/f_t < 1.5 \tag{3}$$

$$-2.8 < \beta_{t2} < -1.5 \tag{4}$$

and $$0.8 < R_a/R_b < 1.6 \tag{5}$$

where:
- $f_1$ is the focal length of said first lens group $G_1$;
- $f_t$ is the focal length of the zoom lens system at the telephoto end;
- $\beta_{t2}$ is the magnification of said second lens group $G_2$ at the telephoto end;
- $R_a$ is the radius of curvature of the lens surface, facing said first end, of said first positive lens element $L_{11}$ of the first lens group $G_1$; and
- $R_b$ is the radius of curvature of the lens surface, facing said first end, of said second lens element $L_{12}$ of said said lens group $G_1$.

7. A zoom lens system, as claimed in claim 3, wherein said fourth lens group $G_4$ comprises a negative lens element $L_{4n}$, said zoom lens system satisfying the following equations (6) and (7):

$$3 < \beta_{t4} < 8 \tag{6}$$

and $$|(R_d+R_c)/(R_d-R_c)| < 1.2 \tag{7}$$

where:
- $\beta_{t4}$ is the actual magnification of the fourth lens group $G_4$ at the telephoto end;
- $R_c$ is the radius of curvature of the lens surface, facing said image, of said negative lens element $L_{4n}$ of the fourth lens group $G_4$; and
- $R_d$ is the radius of curvature of the lens surface, facing said first end, of the negative lens element $L_{4n}$ of the fourth lens group $G_4$.

8. A zoom lens system, as claimed in claim 2, wherein said third, fourth, and fifth lens groups, $G_3$, $G_4$, and $G_5$, of said zoom lens system move along said optical axis, and said third and fifth lens groups, $G_3$ and $G_5$, maintain a constant distance from each other as said system is focused from the infinite-distant object point to the close-distance object point.

9. A zoom lens system, as claimed in claim 8, wherein said first lens group $G_1$ includes a first positive lens element $L_{11}$, a second positive lens element $L_{12}$, and a negative lens element $L_{13}$, said three lens elements being placed in the above order with said first positive element closest to said first end, said zoom lens system also satisfying the following equations (3), (4), and (5):

$$0.5 < f_1/f_t < 1.5 \tag{3}$$

$$-2.8 < \beta_{t2} < -1.5 \tag{4}$$

and $$0.8 < R_a/R_b < 1.6 \tag{5}$$

where:
- $f_1$ is the focal length of said first lens group $G_1$;
- $f_t$ is the focal length of the zoom lens system at the telephoto end;
- $\beta_{t2}$ is the magnification of said second lens group $G_2$ at the telephoto end;
- $R_a$ is the radius of curvature of the lens surface, facing said first end, of said first positive lens element $L_{11}$ of said first lens group $G_1$; and
- $R_b$ is the radius of curvature of the lens surface, facing said first end, of said second lens element $L_{12}$ of said first lens group $G_1$.

10. A zoom lens system, as claimed in claim 8, wherein said fourth lens group $G_4$ comprises a negative lens element $L_{4n}$, said zoom lens system satisfying the following equations (6) and (7):

$$3 < \beta_{t4} < 8 \tag{6}$$

and $$|(R_d+R_c)/(R_d-R_c)| < 1.2 \tag{7}$$

where:
- $\beta_{t4}$ is the actual magnification of the fourth lens group $G_4$ at the telephoto end;
- $R_c$ is the radius of curvature of the lens surface, facing said image, of said negative lens element $L_{4n}$ of the fourth lens group $G_4$; and
- $R_d$ is the radius of curvature of the lens surface, facing said first end, of the negative lens element $L_{4n}$ of the fourth lens group $G_4$.

11. A zoom lens system, as claimed in claim 2, wherein said first lens group $G_1$ includes a first positive lens element $L_{11}$, a second positive lens element $L_{12}$, and a negative lens element $L_{13}$, said three lens elements being placed in the above order with said first positive element closest to said first end, said zoom lens system also satisfying the following equations (3), (4), and (5):

$$0.5 < f_1/f_t < 1.5 \tag{3}$$

$$-2.8 < \beta_{t2} < -1.5 \tag{4}$$

and $$0.8 < R_a/R_b < 1.6 \tag{5}$$

where:
- $f_1$ is the focal length of said first lens group $G_1$;
- $f_t$ is the focal length of the zoom lens system at the telephoto end;
- $\beta_{t2}$ is the magnification of said second lens group $G_2$ at the telephoto end;
- $R_a$ is the radius of curvature of the lens surface, facing said first end, of said first positive lens element $L_{11}$ of the first lens group $G_1$; and $R_b$ is the radius of curvature of the lens surface, facing said first end, of said second lens element $L_{12}$ of the first lens group $G_1$.

12. A zoom lens system, as claimed in claim 2, wherein said fourth lens group $G_4$ comprises a negative lens element $L_{4n}$, said zoom lens system satisfying the following equations (6) and (7):

$$3 < \beta_{t4} < 8 \tag{6}$$

and $$|(R_d+R_c)/(R_d-R_c)| < 1.2 \tag{7}$$

where:

$\beta_{t4}$ is the actual magnification of the fourth lens group $G_4$ at the telephoto end;

$R_c$ is the radius of curvature of the lens surface, facing said image, of said negative lens element $L_{4n}$ of the fourth lens group $G_4$; and $R_d$ is the radius of curvature of the lens surface, facing said first end, of the negative lens element $L_{4n}$ of the fourth lens group $G_4$.

13. A zoom lens system, as claimed in claim 1, wherein said first lens group $G_1$ includes a first positive lens element $L_{11}$, a second positive lens element $L_{12}$, and a negative lens element $L_{13}$, said three lens elements being placed in the above order with said first positive element closest to said first end, said zoom lens system also satisfying the following equations (3), (4), and (5):

$$0.5 < f_1/f_t < 1.5 \tag{3}$$

$$-2.8 < \beta_{t2} < -1.5 \tag{4}$$

and $$0.8 < R_a/R_b < 1.6 \tag{5}$$

where:

$f_1$ is the focal length of said first lens group $G_1$;

$f_t$ is the focal length of the zoom lens system at the telephoto end;

$\beta_{t2}$ is the magnification of said second lens group $G_2$ at the telephoto end;

$R_a$ is the radius of curvature of the lens surface, facing said first end, of said first positive lens element $L_{11}$ of the first lens group $G_1$; and $R_b$ is the radius of curvature of the lens surface, facing said first end, of said second lens element $L_{12}$ of the first lens group $G_1$.

* * * * *